(12) United States Patent
Watanabe et al.

(10) Patent No.: US 7,716,970 B2
(45) Date of Patent: May 18, 2010

(54) SCANNING PROBE MICROSCOPE AND SAMPLE OBSERVATION METHOD USING THE SAME

(75) Inventors: Masahiro Watanabe, Yokohama (JP); Toshihiko Nakata, Hiratsuka (JP); Shuichi Baba, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1033 days.

(21) Appl. No.: 11/411,022

(22) Filed: Apr. 26, 2006

(65) Prior Publication Data

US 2008/0223117 A1 Sep. 18, 2008

(30) Foreign Application Priority Data

Apr. 28, 2005 (JP) ............................ 2005-130739
Mar. 30, 2006 (JP) ............................ 2006-095169

(51) Int. Cl.
*G01B 5/28* (2006.01)
(52) U.S. Cl. ...................................... 73/105
(58) Field of Classification Search ...................... None
See application file for complete search history.

(56) References Cited

U.S. PATENT DOCUMENTS

| 6,520,005 | B2 * | 2/2003 | McWaid et al. | ............... 73/105 |
| 6,877,365 | B2 | 4/2005 | Watanabe et al. | |
| 7,220,962 | B2 * | 5/2007 | Kawakatsu | ............... 250/306 |
| 7,562,564 | B2 * | 7/2009 | Baba et al. | ................... 73/105 |

FOREIGN PATENT DOCUMENTS

| JP | 7-159465 | * | 6/1995 | ................. 250/306 |
| JP | 11-352135 | | 12/1999 | |
| JP | 2001-033373 | | 2/2001 | |
| JP | 2002-206999 | | 7/2002 | |
| JP | 2003-202284 | | 7/2003 | |
| JP | 2004-125540 | | 4/2004 | |
| JP | 2004-264039 | | 9/2004 | |
| WO | WO 02/103328 | * | 12/2002 | ................. 250/306 |
| WO | WO 2004/074816 | * | 9/2004 | ................... 73/105 |

* cited by examiner

*Primary Examiner*—Daniel S Larkin
(74) *Attorney, Agent, or Firm*—Antonelli, Terry, Stout & Kraus, LLP.

(57) ABSTRACT

The present invention provides a method of using an accurate three-dimensional shape without damaging a sample by making a probe contact the sample only at a measuring point, lifting and retracting the probe when moving to the next measuring point and making the probe approach the sample after moving to the next measuring point, wherein high frequency/minute amplitude cantilever excitation and vibration detection are performed and further horizontal direction excitation or vertical/horizontal double direction excitation are performed to improve the sensitivity of contacting force detection on a slope of steep inclination. The method uses unit for inclining the probe in accordance with the inclination of a measurement target and a structure capable of absorbing or adjusting the orientation of the light detecting the condition of contact between the probe and sample after reflection on the cantilever, which varies a great deal depending on the inclination of the probe.

16 Claims, 21 Drawing Sheets

FIG. 25A
FIG. 25B
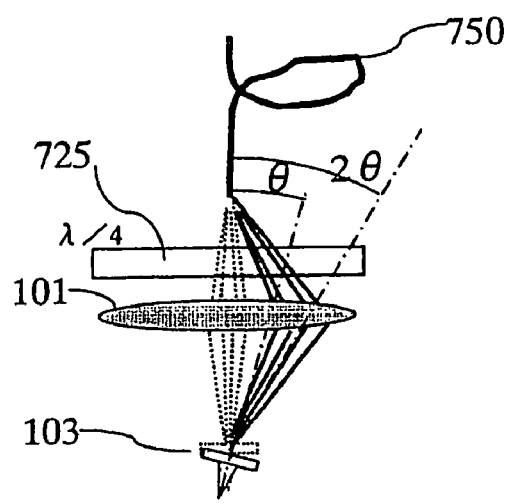 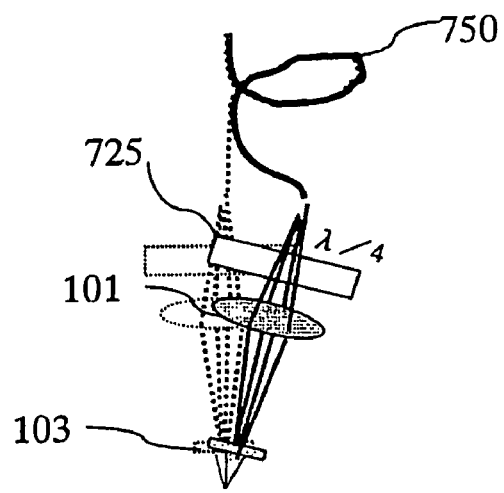

SCANNING PROBE MICROSCOPE AND SAMPLE OBSERVATION METHOD USING THE SAME

The present application is based on and claims priorities of Japanese patent applications No. 2005-130739 filed on Apr. 28, 2005 and No. 2006-095169 filed on Mar. 30, 2006, the entire contents of which are hereby incorporated by reference.

BACKGROUND OF THE INVENTION

1. Field of the Invention

The present invention relates to a scanning probe microscope technique and sample observation method using the same and device manufacturing method.

2. Description of the Related Art

As a technique for measuring minute three-dimensional shapes, a scanning probe microscope (SPM) is known. This is a widely employed technique whereby minute three-dimensional shapes of the atomic order can be measured, by scanning a sample whilst maintaining the contacting force at an extremely small value while controlling a probe with a sharp tip.

On the other hand, dimensional control using a CD-SEM (Critical Dimension SEM) is currently carried out in an LSI minute pattern formation process, but with the advance of pattern miniaturization, the pattern formation process is facing the following limits. (1) Problem with measurement accuracy. The gate width of a 65 nm node LSI, which is expected to become the mainstream in 2007, is 25 nm and if its allowable variation is assumed to be 10% and measurement accuracy is assumed to be 20% thereof, the required measurement accuracy is estimated to be 0.5 nm. (2) Demand for profile measurement. There is a growing demand for the introduction of APC (Advanced Process Control) for high-accuracy control of line widths and this requires a technique for measuring not only pattern wiring widths but also sectional shapes which have a considerable influence on electrical characteristics. (3) Problem with measurement target. There is a growing need for measurement of materials with low electron beam resistance such as resists for DUV (deep ultraviolet rays), low-k (low dielectric constant) film material.

It is difficult for the current CD-SEM to deal with the above described problems and requirements. For this reason, a scanning probe microscope technique seems to be a promising technique. What is required in this case is a scanning probe microscope technique applicable to a pattern having a large aspect ratio and an inclination of step locations of approximately 90 degrees.

On the other hand, Japanese Patent Laid-Open Publication No. 11-352135 discloses a method of scanning a sample while vibrating the sample or probe with certain amplitude to make the probe collide periodically with the sample and reduce damages to a soft, brittle sample and probe. Furthermore, Japanese Patent Laid-Open Publication No. 2001-33373 discloses a method of performing servo control on a probe at only discrete measuring points, measuring heights and moving to the next measuring point with the probe lifted. This method requires fewer contacts and has less damage to a soft, brittle sample and probe. This method does not drag the probe and thereby has an advantage of being able to measure shapes in step locations faithfully. Furthermore, Japanese Patent Laid-Open Publication No. 2002-206999 also discloses a method combining both operations.

However, there is a problem that the probe slips slightly in a steep incline and the measured shape is distorted even when the above described methods are used. Another problem is that the probe is worn due to the slippage of the probe and vibration of the probe.

In other words, it has been difficult for the techniques disclosed in the above described patent documents to measure shapes accurately because the probe slips slightly in a steep incline for a sample having a high aspect ratio, and the measured shapes are distorted. Furthermore, the probe is worn due to the slippage and vibration of the probe and it is difficult to measure the shapes stably and accurately.

SUMMARY OF THE INVENTION

In order to solve the above described problems, the present invention uses a measuring method of repeating retracting/approaching of a probe for each measuring point, thereby realizing shape measurement without damaging a sample with high accuracy and at a high speed. Furthermore, the present invention also measures a pattern of a semiconductor sample and feeding back the measuring result to process conditions, thereby realizing stable and accurate device manufacturing.

In order to solve the above described problems, the scanning probe microscope of the present invention not only uses a measuring method of repeating retracting/approaching a probe for each measuring point so as to perform high accuracy measurement without damaging a sample but also detects contacts at a high speed and with high sensitivity by causing the probe to minutely vibrate with amplitude of the atomic order and at a high frequency, thereby realizing measurements with no slippage of the probe at times of contact. It also forms a stable and accurate pattern by measuring a pattern of a semiconductor sample and feeding back the measurement result to process conditions, measures accurate shapes of step locations by scanning the sample with the probe inclined for step locations of steep inclination of the sample and also measures accurate shapes of overhanging step locations.

The present invention is provided with a high-sensitivity proximity sensor, and can thereby realize high-speed approach of the probe to the sample and exert an effect of being able to improve throughput of measurement.

The present invention realizes high-speed scanning of the sample while realizing high accuracy measurement of a soft, brittle material or a pattern with steep steps with the probe contacting the sample intermittently without dragging the probe on the sample and with the probe inclined for step locations of steep inclination of the sample, and can thereby exert the effect of being able to realize accurate measurement of the shapes of step locations.

BRIEF DESCRIPTION OF THE DRAWINGS

FIG. 25A and FIG. 25B illustrate an optical system adaptable to the inclination of the cantilever according to Embodiment 23 of the present invention.

DETAILED DESCRIPTION OF THE PREFERRED EMBODIMENTS

With reference now to the attached drawings, embodiments of the present invention will be explained below.

Embodiment 1

Figure 1:
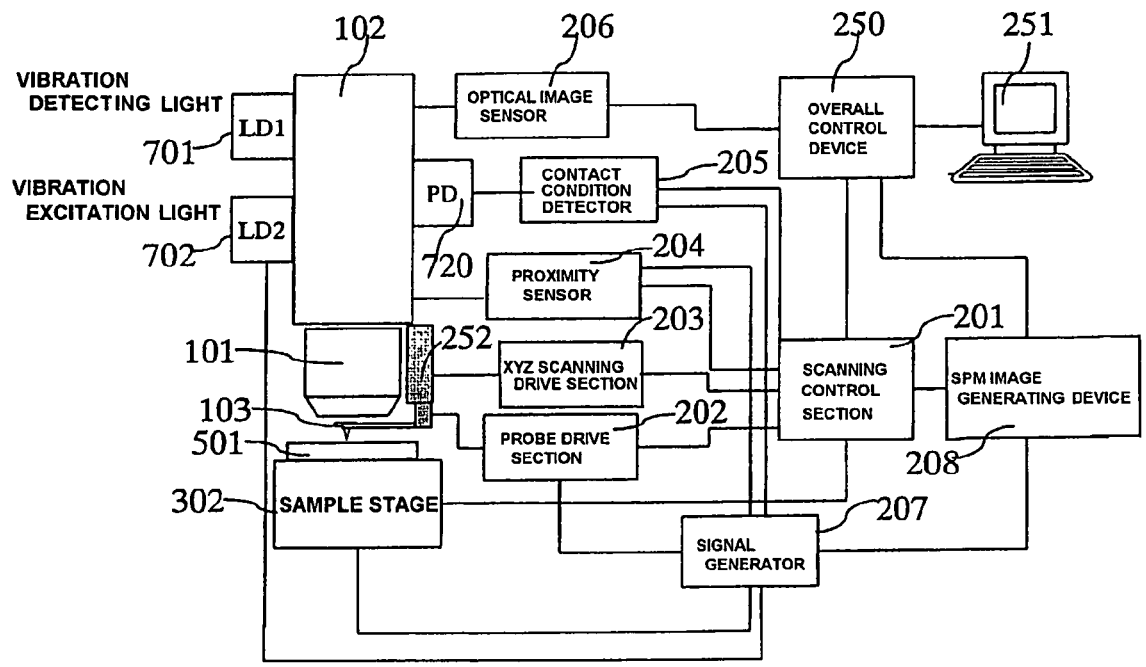
FIG. 1 illustrates the overall construction of a scanning probe microscope according to Embodiment 1 of the present invention.

FIG. 1 shows the construction of a scanning probe microscope according to Embodiment 1 of the present invention. A sample 501 is placed on a sample stage 302 which can be driven in the X, Y, Z directions and controlled by a scanning control section 201. A probe transfer mechanism 252 provided with a probe 103 is driven in the X, Y, Z directions by a signal from a XYZ scanning drive section 203 to thereby perform probe scanning of the scanning probe microscope.

It is possible to generate minute vibration in the probe 103 itself or an actuator made up of a piezoelectric element or the like disposed at the base of the probe by a signal from a probe drive section 202. Or as another embodiment, the signal from the probe drive section 202 may be superimposed on the signal from the XYZ scanning drive section 203 to cause minute vibration in the probe transfer mechanism and thereby excite vibration in the probe 103 attached. Or as will be described later, vibration excitation light may be directly irradiated onto the probe so as to excite minute vibration in the probe 103.

In FIG. 1, reference numeral 101 denotes a probe/sample observation lens and observation of the sample/probe from above, measurement of vibration or measurement of excitation of vibration and sample height is performed through this lens. Since this lens follows the movement of the probe always focused on the probe, the lens is preferably driven together with the probe as one unit by the probe transfer mechanism 252.

Approach of the probe 103 to the sample 501 may be performed through drive control of the sample stage 302 in the Z direction or a Z direction coarse adjustment function provided for the probe transfer mechanism 252. The scanning control section 201 controls the approach of the probe 103 to the sample 501 using the contact condition between the probe 103 and sample 501 detected by a contact condition detector 205.

A proximity sensor 204 is a sensor to measure the height close to the tip of the probe with high sensitivity and when this proximity sensor is used in addition to information from the contact condition detector, it is possible to realize high-speed approach to the sample without causing the probe to collide with the sample by detecting contact of the probe with the sample beforehand and controlling the approaching speed. Light may be used for the proximity sensor 204 as will be described later, but any other sensor may also be used if it has a detection range of several tens of micrometers, capable of detecting a distance from the sample with sensitivity of approximately 1 micrometer.

For example, it is possible to use an electrostatic capacitive sensor which measures an electrostatic capacitance with an AC voltage applied between a sensor head (not shown) provided right above the sample 501 or the probe 103 and sample 501 and detects the distance or an air micro sensor which detects a pressure by feeding air from the sensor head between the sensor head (not shown) provided right above the sample 501 and sample 501.

The scanning control section 201 controls the contact condition detector 205 of the probe, proximity sensor 204, probe holder drive section 203, probe drive section 202 and sample stage 302 and realizes approaching of the probe and scanning of the sample or the like. At this time, an image of the surface shape of the sample is obtained by sending a signal during scanning of the sample to an SPM image generating device 208. Furthermore, a signal application device 207 excites the probe at a high frequency to detect a response through the contact condition detector 205 and measure elasticity of the surface or the like, or applies an AC or DC voltage between the probe and sample to measure a current or measure a capacitance or resistance.

By realizing this measurement concurrently with scanning of the probe, it is possible to obtain an image of distribution of additional properties in addition to the image of the surface shape on the SPM image generating device 208.

The operation of the overall apparatus is controlled by an overall control device 250 and a display/input device 251 can receive an instruction from the operator or display an optical image or SPM image.

An AC component of light intensity signal A(t) detected by the contact condition detector 205 in FIG. 1 is cos $2\pi(\Delta ft + 2Z/\lambda)$, where Z is displacement of the probe 103 caused by vibration, $\lambda$ is the wavelength of a laser, and t is time. Therefore, the displacement of the probe 103 can be calculated by detecting the phase of this signal. The phase may be detected by using a signal of frequency $\Delta f$ given to an acoustic optical element in a two-frequency light generator 701 or a signal of frequency $\Delta f$ obtained by branching a part of the two beams generated from the two-frequency light generator 701 and causing it to directly interfere with the other without irradiating it onto the probe as a reference and inputting the signal together with A(t) to the phase detection circuit.

Or if a phase difference between optical intensity signal A(t) itself and signal A(t−$\Delta$t) which is delayed by $\Delta$t from A(t) is detected, the variation component of this phase difference is $2(Z(t)-Z(t-\Delta t))/\lambda$, and therefore it is possible to detect a variation of Z in $\Delta$t, that is, the speed of Z.

Here, if it is assumed that the frequency of vibration of the probe is g and the amplitude is B, their relationship is expressed by $z(t)=B \sin 2\pi gt$. Then, $\Delta Z=Z(t)-Z(t-\Delta t)=(2\pi g \cdot B\Delta t)\cos(2\pi gt)$ is obtained and when the oscillation frequency g of the probe is increased, the detection sensitivity of vibration improves, and therefore it is more desirable to detect a phase difference from the signal obtained by delaying A(t) itself.

The vibration of the probe 103 detected in this way is given to the signal generator 207, a signal in the frequency band to be oscillated by a band pass filter is selected, an appropriate phase difference and gain are given thereto, and then the signal is fed back to the probe 103 through the probe drive section 202 to excite the probe 103. Or the signal is given to a vibration excitation light source 702, intensity of light irradiated onto the probe 103 is modulated and the probe 103 is directly excited by this modulated light. When the phase difference and gain are set appropriately, the probe starts vibrating with necessary amplitude.

Figure 2A:
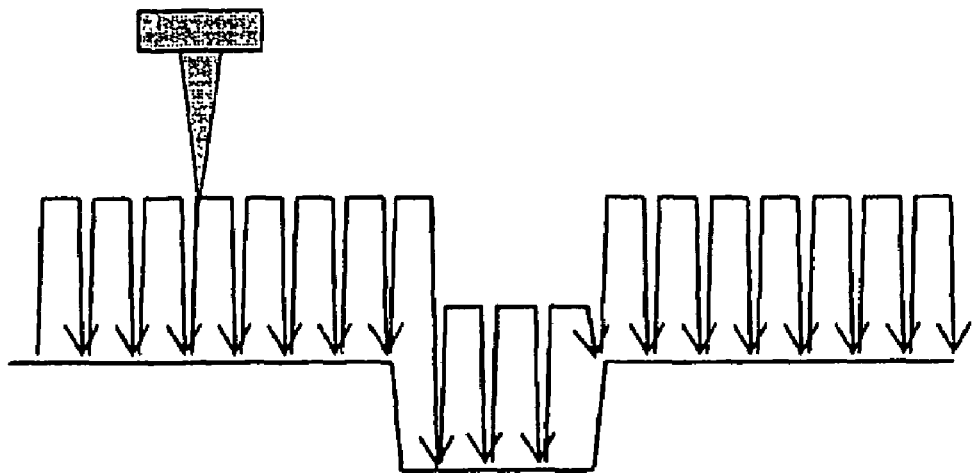
FIG. 2A, FIG. 2B and FIG. 2C illustrate the operation of the probe, which also corresponds to the operation of the probe when controlling a retraction distance of the probe according to Embodiments 17, 18 of the present invention.
Figure 2B:
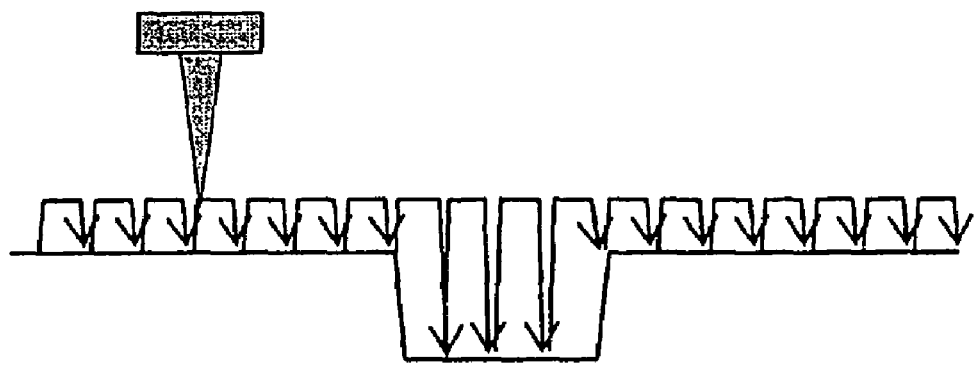
Figure 2C:
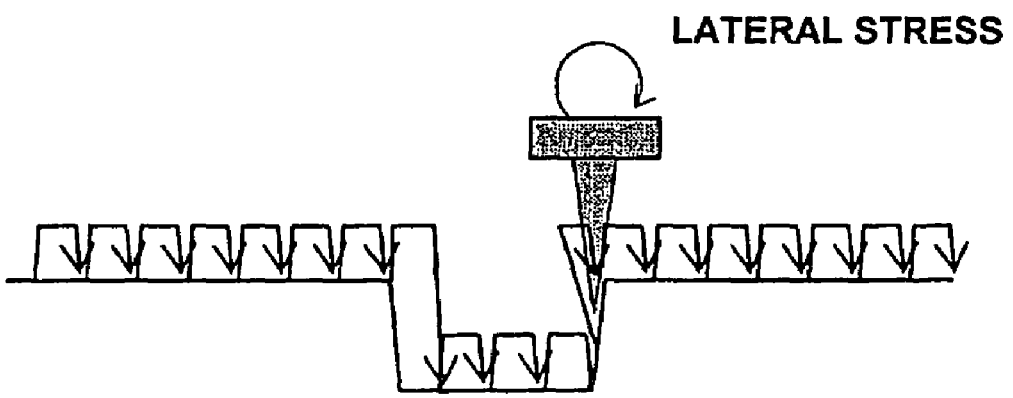

FIG. 2A, FIG. 2B and FIG. 2C show tracks of the probe. According to a system normally used so far, the probe is moved in the horizontal direction to trace the surface of the sample while keeping contact between the probe and sample. As such, a force in the horizontal direction is applied to the probe on a steep slope, causing the probe to twist or the probe to stop vibrating resulting in a problem that it is not possible to detect the contact condition of the probe accurately.

Figure 3:
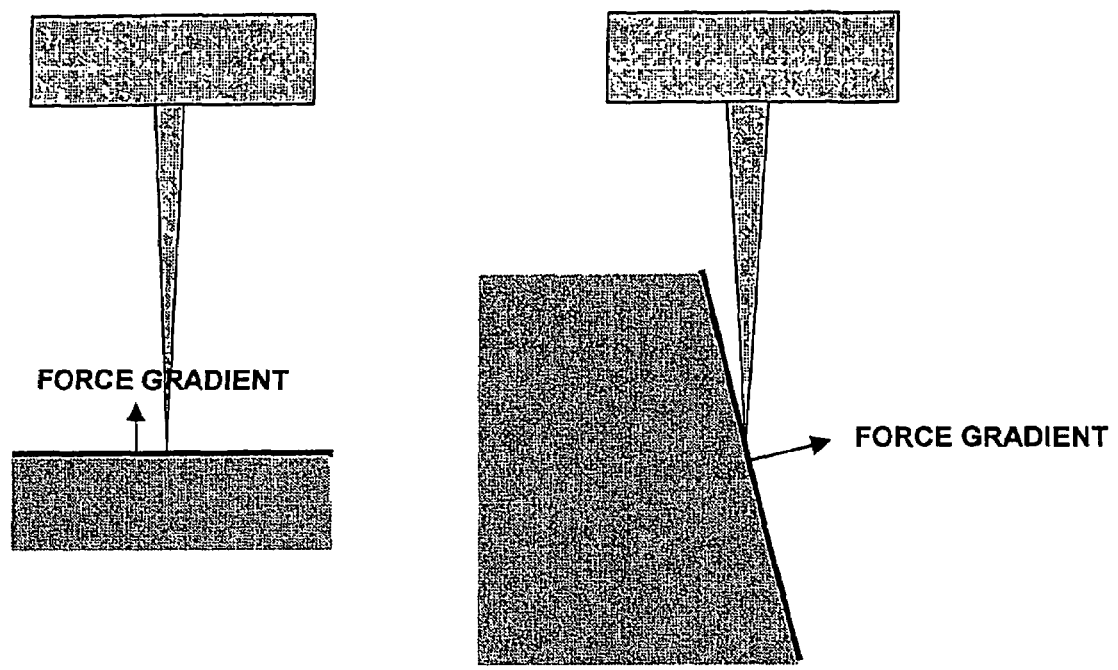
FIG. 3 illustrates a relationship between the probe and the inclination of the sample, which also corresponds to a relationship appropriate for measurement of a sample having a high aspect ratio such as a semiconductor pattern of Embodiment 9 of the present invention.

On the contrary, according to Embodiment 1 of the present invention, as shown in FIG. 2A, FIG. 2B and FIG. 2C, the probe is made to descend toward the sample and the height of the probe is recorded when a predetermined contact condition is obtained, the probe is lifted and moved in the horizontal direction, then the probe is moved to the next measuring point and the probe is made to descend again. This process is repeated and the surface shape of the sample is measured. Using such a method, it is possible to measure the surface shape of the sample accurately even on such a steep slope as shown in FIG. 3.

However, even using such a method, there is a problem that the probe is slipped slightly causing the surface shape to be slightly distorted. On the contrary, there is also a method of combining vibrations of the probe as disclosed in Japanese Patent Laid-Open Publication No. 2002-206999, but collision occurs many times when the probe and sample contact each other, and so the probe and sample are worn and damaged and moreover if collision does not occur many times, the vibration condition of the probe does not change, and so the response of detection of the contact between the probe and sample deteriorates and there is a problem that attempting to perform a high-speed surface shape measurement causes the shape accuracy to deteriorate and also increases the wear of the probe.

The present invention causes the probe to generate high-speed minute vibration with minute amplitude of the atomic order, thereby reduces the wear of the probe, improves the response and sensitivity of contact detection and realizes a high-speed and accurate surface shape measurement.

Figure 4:
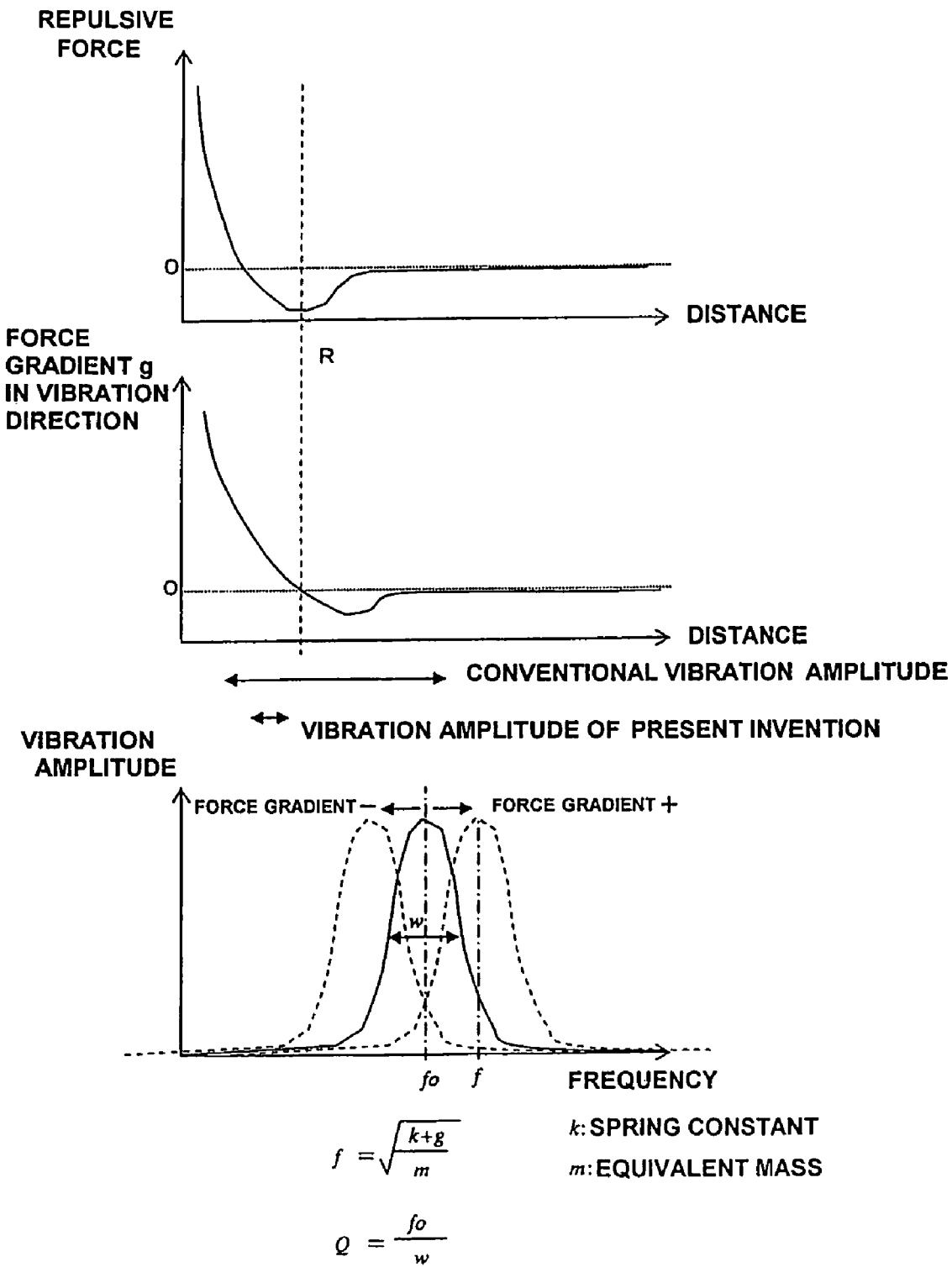
FIG. 4 illustrates the principles of detection of a contact condition by vibration.

FIG. 4 illustrates the principles of detection of the contact condition of the probe. As shown in the above figure, when the distance between the tip of the probe and sample is shown on the horizontal axis and an interatomic force is shown on the vertical axis with a repulsive force considered as positive, the attracting force gradually increases as the distance decreases, but when the distance falls below a distance R, the attracting force starts to decrease and drastically shifts to a repulsive force and the repulsive force increases.

As shown in the middle figure of FIG. 4, when plotting is done over again with a force gradient shown on the vertical axis, the force gradient drastically increases when the distance falls below R as a borderline. When the probe is made to vibrate in this field of force, if the probe is regarded as an oscillator, its spring constant varies according to the gradient of the interatomic force in the vibration direction of the probe, and as shown in the figure at the bottom of FIG. 4, the resonance frequency increases in the area where the repulsive force increases due to an increase of the spring constant, while the resonance frequency decreases in the area where the attracting force increases due to a decrease of the spring constant.

As shown in FIG. 4, by exciting vibration at point f which is slightly shifted from resonance frequency fo, it is possible to make a setting so that the vibration amplitude changes in accordance with the magnitude of the force gradient where the probe is located. It is possible to detect the force gradient using this.

In order to make the probe vibrate stably and detect the contact of the probe as a sufficient signal, the probe is conventionally made to vibrate with large amplitude such as several nanometers to several tens of nanometers so as to range from the attracting force area to the repulsive force area. For this reason, the repulsive force drastically increases at the bottom of vibration.

On the contrary, Embodiment 1 of the present invention suppresses the amplitude of vibration to or below 1 nanometer of the atomic order to thereby reduce the contacting force. When the amplitude is reduced, the detection S/N ratio (signal to noise ratio) generally degrades, but it is possible to augment the signal by increasing the oscillation frequency.

That is, this is because if vibration is expressed as $A \sin 2\pi gt$, where A is the amplitude and g is the frequency, the displacement rate is obtained by differentiating this as $2\pi Ag \cos 2\pi gt$ and the amplitude of the displacement rate increases in proportion to the frequency. The displacement rate can be detected with high sensitivity through laser Doppler measurement as will be described later.

Or the displacement rate can also be calculated by differentiating an optical lever signal whereby the flexure of the probe is detected with an angle of reflection of a laser irradiated onto the probe, which will be described later separately. Furthermore, in addition to the amplitude, the phase and frequency also change according to the contact condition, and therefore these can also be detected. Or it is possible to detect the vibration condition of the probe by incorporating a sensor that generates a signal due to deformation of the probe such as a strain gauge in the probe.

Another problem is the response speed of contact detection. The Q value indicating the sharpness of vibration is expressed as Q=f/w from oscillation frequency f and width w where the amplitude of vibration becomes half, but it is necessary to repeat vibration on the order of Q times after the probe detects the contact until the vibration condition changes. That is, approximately T=Q/f is required as a time constant of response. Q is generally on the order of several hundreds, f is generally approximately 100 to 300 kHz, and for this reason, approximately T=1 ms is required. Furthermore, the spring constant is approximately k=10 to 50 N/m and when the probe is made to approach at a speed of approximately v=10 nm/ms in an attempt to perform the approaching operation of the probe shown in FIG. 2A, FIG. 2B and FIG. 2C at a high speed, the probe advances by approximately vT=10 nm during T, and therefore a contacting force of approximately kvT=100 to 500 nN is generated, causing slippage of the probe and damage to the probe and sample.

In order to prevent the slippage of the probe and damage to the probe and sample, it is necessary to suppress the contacting force to at least 5 nN or less and 1 nN or less if possible. Suppression of the contacting force requires T to be set to a small value. For this reason, designing the cantilever and excitation control to suppress Q degrades the contact condition detection sensitivity, and therefore it is only possible to reduce Q to approximately 20 at most. Therefore, unless the approaching speed of the probe is reduced to approximately v=1 nm/ms, it is not possible to perform approaching/contacting operation with a contacting force of approximately 1 nN.

The retracting/approaching distance needs to get rid of an adhesive force resulting from surface tension between the sample and probe or the like and secure approximately 10 nm to deal with the unevenness of the sample, and therefore it takes time of approximately 10 ms for the probe to approach, and even if the retracting and traversing speeds of the probe are increased, it takes time of at least 10 ms for total retraction/transfer/approach and the measuring speed cannot be increased sufficiently.

To further decrease the contacting force, it is necessary to reduce the approaching speed, which leads to an increase of the measuring time. In order to solve this problem, the present invention increases the frequency of vibration. In this way, since time constant T=Q/f of response decreases in inverse proportion to the frequency, and therefore it is possible to detect the variation of the contact condition at a high speed. For example, if f is increased to 400 kHz or above, it is possible to decrease the contacting force to ¼ or increase the measuring speed four-fold compared to the case with 100 kHz.

For example, if f is increased to 1 MHz or above, it is possible to decrease the contacting force to 1/10 compared to the case of 100 kHz or increase the measuring speed 10-fold. For example, in the latter case, measurement is possible with a contacting force of 1 nN at an approaching speed of 10 nm/ms and when the retraction distance is assumed to be 10 nm, measurement is possible at a speed of approximately 1 to 2 ms per point. When f is further increased to 10 MHz, it is possible to reduce the contacting force down to 0.1 nN at the same measuring speed.

As another embodiment for realizing speed enhancement and high accuracy, by sampling the height of the probe at the moment at which a signal indicating the contact condition crosses a set threshold, it is possible to measure the height of the sample at the measuring point with a much smaller contacting force even at the same approaching speed.

This reason will be shown below. According to the method whereby the probe is made to descend toward the sample and the height of the probe is recorded when a certain contact condition is achieved, the probe may slip on the slope of the sample due to the delay in detection of the contact condition and the height after the probe is modified may be measured. However, by setting a threshold of a minute contact condition which is different from a final contact condition and sampling it at the moment at which this threshold is crossed, it is possible to measure the accurate height before the probe slips on the slope of the sample and the probe is deformed.

A third problem is how to handle a minute pattern. When the shape of a steep valley of a minute pattern is measured, it is necessary to stably move the probe to the valley bottom while vibrating the probe. At this time, if the amplitude is large, the probe is blocked by side walls on both sides and it is difficult to allow the probe to reach the valley bottom. The thickness of a semiconductor pattern will be 65 nm in 2007 and then further narrowed to 35 nm. For this reason, it is necessary to set vibration of the probe to on the order of 1 nm.

Various methods to increase the resonance frequency of the probe are conceivable. One is a method of exciting vibration according to the frequency of harmonic, a second method is to excite vibration according to the resonance frequency in a different mode such as torsion vibration instead of vibration of bending the probe, a third method is to increase the fundamental resonance frequency of the probe. As for the third method, if the thickness of the cantilever section of the probe is simply increased, the resonance frequency increases but the spring constant also increases. When the cantilever section has a strip-like shape, spring constant $k=Ebh^3/(4L^3)$ is obtained, where b is the width, h is the thickness, L is the length and E is Young's modulus. On the other hand, the resonance frequency becomes $f=0.56(h/L^2)\sqrt{(E/12\rho)}$, where $\rho$ is the density of the cantilever.

Therefore, if, for example, the length L and thickness h are reduced at the same rate while the width b is kept constant, it is possible to increase the resonance frequency in reverse proportion to the length L while keeping the spring constant k constant. This makes it possible to improve contact condition detection sensitivity and response.

Figure 5:
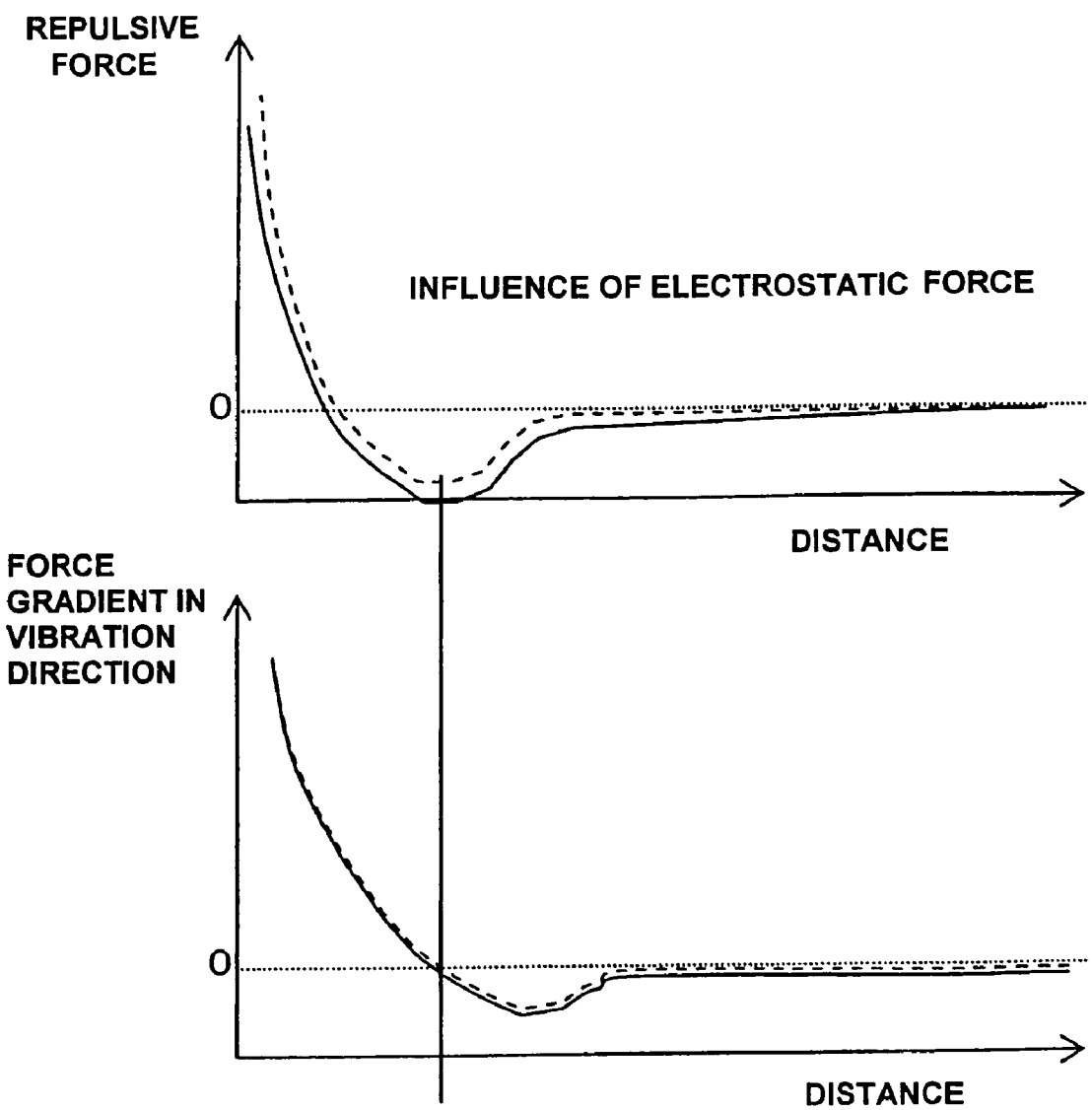
FIG. 5 illustrates influences of charging on detection of the contact condition by vibration.

Furthermore, as shown in FIG. 5, using this system can reduce the influence of charging of the sample. The electrostatic force generated by charging gradually increases from a distant place compared to the way an interatomic force changes. For that reason, the relationship between the repulsive force and distance is shifted a great deal, but the change in the electrostatic force is gentle, and therefore when converted to a force gradient, the change remains a tiny offset as shown in the lower graph in FIG. 5. For this reason, according to the method of detecting static deformation between the probe and sample using a cantilever with a small spring constant, the probe is deformed a great deal and the measurement accuracy of the contacting force degrades, but using the method of the present invention whereby the contact condition is detected by vibrating the probe, the influence of the electrostatic force can be suppressed to a small value.

Embodiment 2

Figure 6:
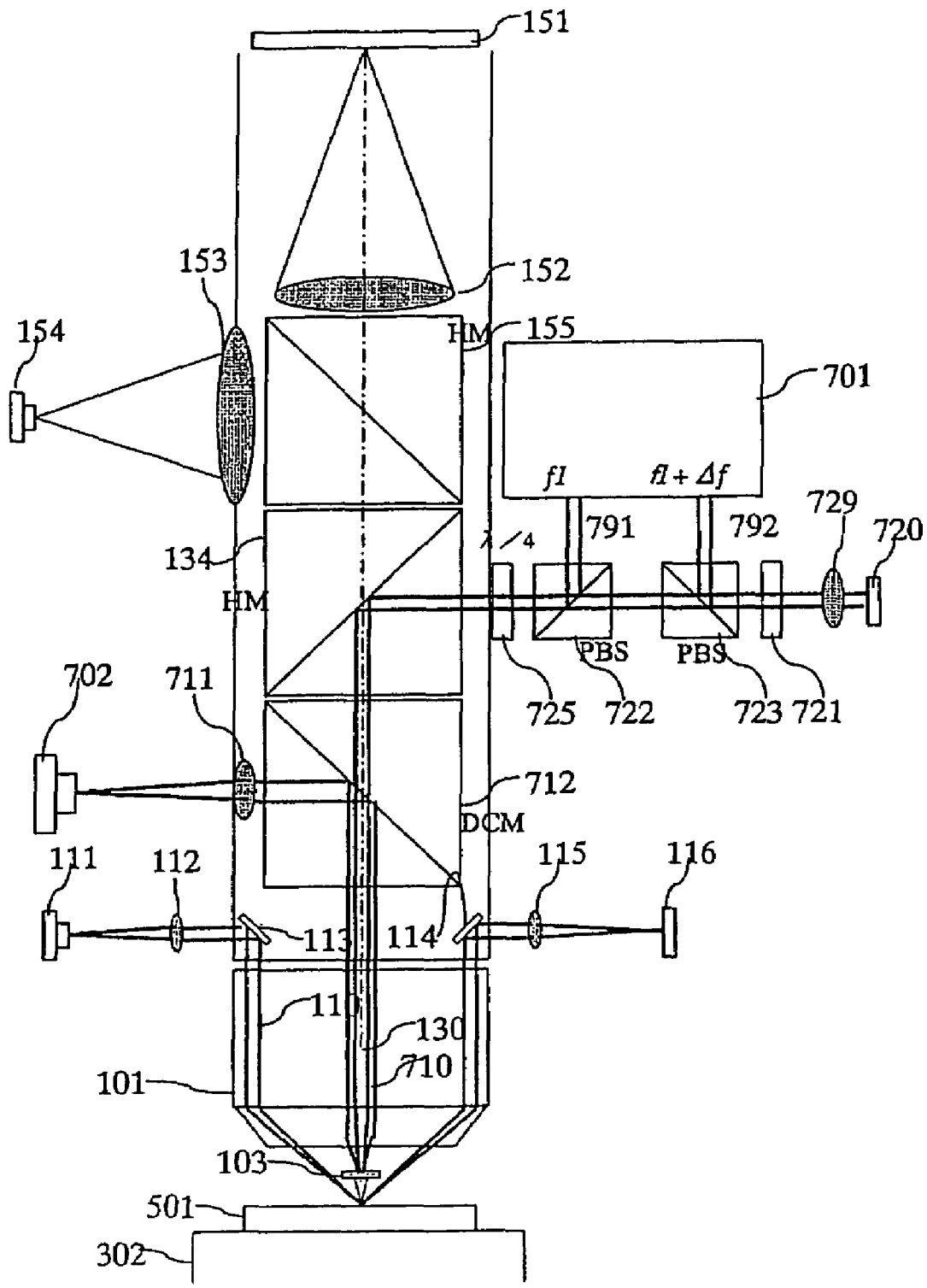
FIG. 6 illustrates an optical system of a scanning probe microscope according to Embodiment 2 of the present invention.

FIG. 6 illustrates an optical system of a scanning probe microscope according to Embodiment 2 of the present invention. Light emitted from a light source 111 is transformed to parallel light by a lens 112, reflected by a mirror 113, introduced to a lens 101 and focused on a sample 501. An image in an arbitrary shape such as a spot or slit can be formed depending on the shape of the opening incorporated in the light source 111. Light reflected on the sample passes through an objective lens again, reflected by a mirror 114 and an image thereof is formed on a detector 116 through an image forming lens 115. The position of the image is moved according to the height of the sample 501. The amount of movement is expressed by $2\pi Z \tan \theta$, where $\theta$ is the angle of incidence of detection light 110 upon the sample, m is image forming magnification by the lens 115 and Z is the height of the sample, and therefore it is possible to detect the height Z of the sample by measuring this amount of movement.

Since the detector 116 needs only to be able to detect the position of the image, a PSD (position sensitive device), separation type photodiode, linear image sensor or the like may be used. Moreover, the above described explanation assumes the construction in which the detected light 110 passes through the objective lens, but another construction is also conceivable in which the detected light 110 passes outside the objective lens, is bent by another mirror (not shown) and an image thereof is formed on the sample. At this time, the lenses 112 and 115 are adjusted so that the light source 111 and sensor 116 have an image forming relationship with the sample 501. The amount of movement of the image on the sensor 116 in this case is $2mZ \sin \theta$.

Hereinafter, detection of a contact condition of the probe will be explained. Two beams (791 and 792) having a small frequency difference between frequency f1 and frequency f1+Δf are generated from a two-frequency light generator 701. The two beams are generated, for example, by splitting light from a laser using a beam splitter, letting one beam pass through an acoustic optical element and thereby shifting the frequency by Δf. Or a dual-frequency laser which generates two beams whose polarization planes are perpendicular to each other is also commercially available. The first beam 791 is polarized in a direction in which it is reflected by a polarization beam splitter 722 and emitted from the two-frequency light generator 701. The light reflected by the polarization beam splitter 722 passes through a 1/4 wave plate 725, is converted to circular polarization, passes through a beam splitter 134 and a dichroic mirror 712 if necessary and then passes through the lens 101 as detected light 130 and is irradiated onto the back of the probe 103.

The light reflected here goes back through the same optical path, passes through the 1/4 wave plate 725 and is converted to linear polarization in a direction perpendicular to the beam 791 emitted from the two-frequency light generator. Therefore, this light passes through the polarization beam splitter 722 and also passes through the next polarization beam splitter 723. Here, if the polarization direction of the other beam 792 having the frequency f1+Δf emitted from the two-frequency light generator 701 is adjusted to a direction in which it is reflected by the polarization beam splitter 723, it is reflected by the beam splitter 723 and therefore the reflected light merges with the light reflected from the probe 103, passes through a polarizing plate 721 and reaches a photodiode 720.

The polarization directions of the beams 791 and 792 when passing through the polarizing plate 721 are perpendicular to each other. When the polarizing plate 721 is tilted at an intermediate angle in the polarization directions of both beams, both beams interfere with each other and produce a variation in light intensity at frequency Δf, which is detected by the photodiode 720. It is also possible to place a lens 729 for condensing the laser on the photoreceiving plane in front of the photodiode 720.

In FIG. 6, alight source 702 is a light source for vibration excitation. It is preferable to use a semiconductor laser so that light is modulated at a high speed. The light emitted here passes through a lens 711, is reflected by the dichroic mirror 712 manufactured so as to reflect the wavelength of the light source 702, directed to the lens 101 and condensed by the lens 101 and irradiated onto the probe 103. When this light intensity is modulated, distortion is produced in the probe 103 and vibration is excited. The excitation light reflected by the probe 103 goes back through the original optical path, but it is reflected by the dichroic mirror 712, and therefore it does not go through the optical path of the laser for detection.

The sample observation system will be explained. Illumination light for observation is emitted from an illumination light source 154, passes through a condenser lens 153, is reflected by a beam splitter 155, passes through a beam splitter 134 and a dichroic mirror 712, passes through the lens 101 and illuminates the sample 501 and probe 103. The reflected light passes through the objective lens again, passes through the beam splitters 134 and 155, an image thereof is formed by an image forming lens 152 and detected by an image sensor 151.

As explained above using FIG. 6, by coaxially constructing the probe and sample observation system, sample height sensor, probe vibration detection optical system and probe vibration excitation optical system, it is possible to facilitate simultaneous observation at SPM measuring positions and probe adjustment and realize high-speed approach of the probe to the sample. Furthermore, by coaxially constructing the probe flexure detection optical system, it is also possible to irradiate the detected light 130 and excitation light 710 onto the probe of a small area of the cantilever section and using a lighter probe having a higher resonance frequency makes it possible to increase the scanning speed and improve contact condition detection sensitivity. Furthermore, by performing all detection through the objective lens, it is possible to bring the objective lens closer to the probe and realize an optical observation of a sample with high resolution.

Embodiment 3

Figure 7:
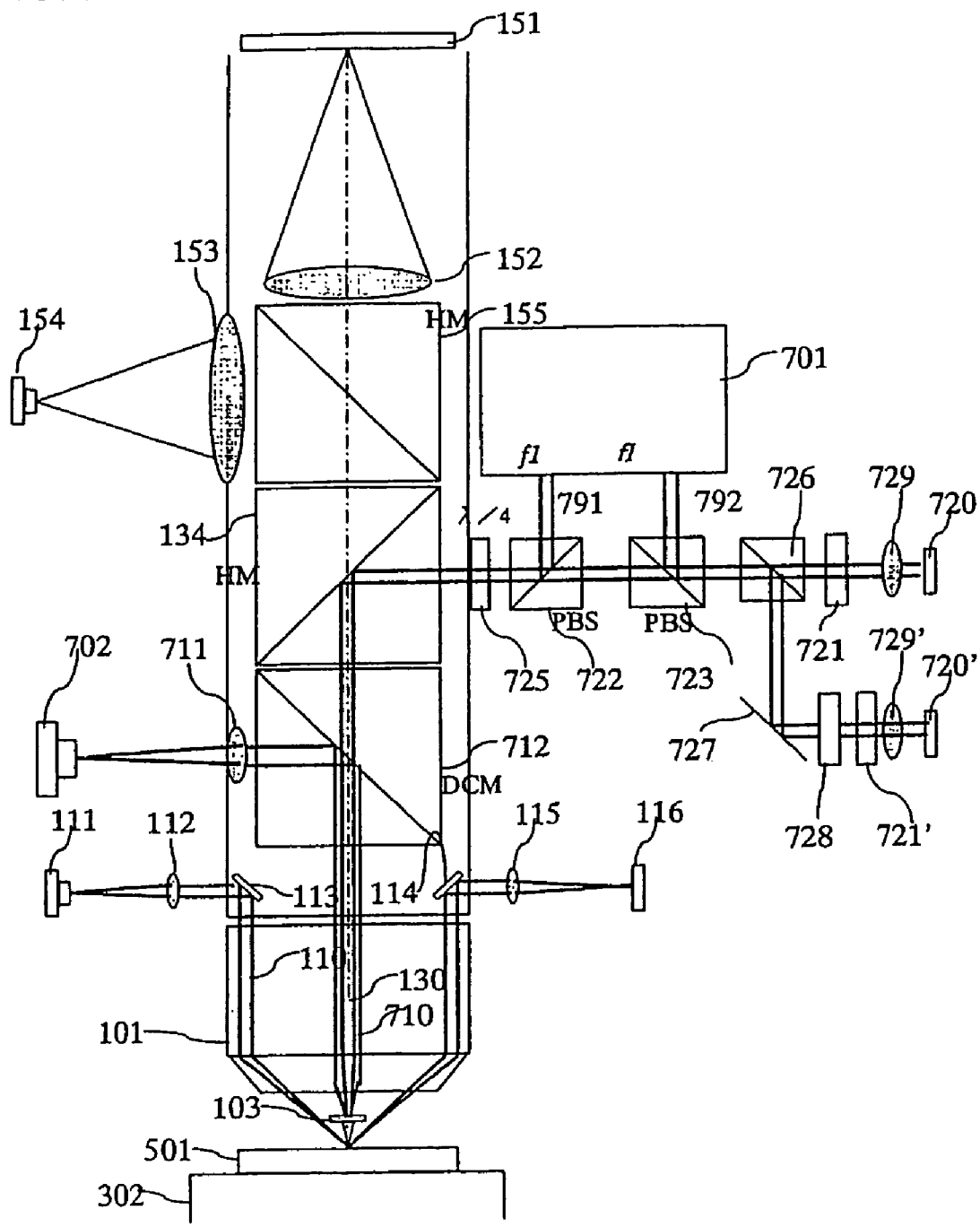
FIG. 7 illustrates another optical system according to Embodiment 3 of the present invention.

FIG. 7 shows an optical system according to Embodiment 3 of the present invention. Embodiment 2 uses so-called heterodyne detection using two-frequency light, but instead of heterodyne detection, it is also possible to use homodyne detection using light of a single frequency. In this case, this embodiment is the same in that light of frequency f1 is branched and used as reference light 792 and detected on a photodiode, but in order to detect the phase, a laser is branched by a half mirror 726 as shown in FIG. 7, one beam is reflected by a mirror 727, a phase difference of 90 degrees between the reference light and detected light is provided using a λ/4 wave plate 728, both beams are made to interfere with each other by a polarizing plate 721', passed through a lens 729' and detected by a second photodiode 720'. Signals from the first and second photodiodes 720, 720' become signals corresponding to cos and sin and by detecting the amplitudes of the components corresponding to resonance frequencies of the respective signals and then taking the square root of the sum of squares, it is possible to detect the vibration amplitude of the probe.

Embodiment 4

Figure 8:
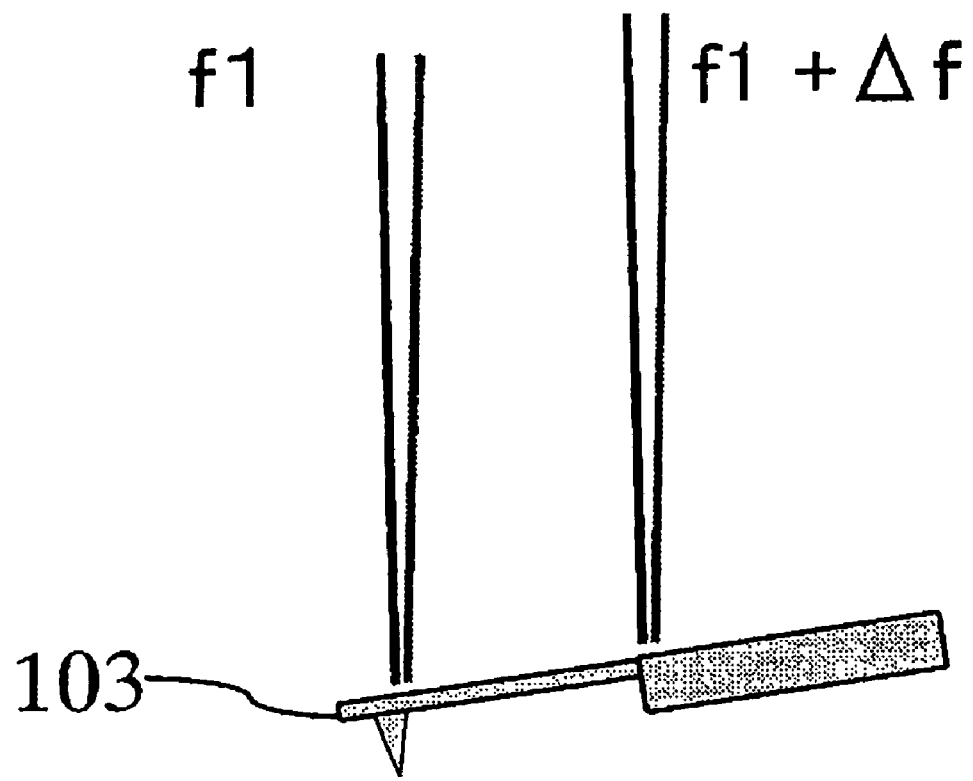
FIG. 8 illustrates the principles of measuring probe flexure by heterodyne interference, which corresponds to Embodiment 4 of the present invention.

FIG. 8 shows an optical system according to Embodiment 4 of the present invention. As another Embodiment, as shown in FIG. 8, by also guiding reference light 792 to the base of the probe to cause interference, it is possible to detect the inclination of the probe without being affected by variations in the middle of the optical path. This makes it possible to carry out not only vibration detection of the probe but also probe scanning control using static detection of flexure of the probe. Reference light 792 in this case may be subjected to heterodyne detection with a frequency variation of Δf or may also be subjected to homodyne detection with no frequency variation.

Embodiment 5

Figure 9:
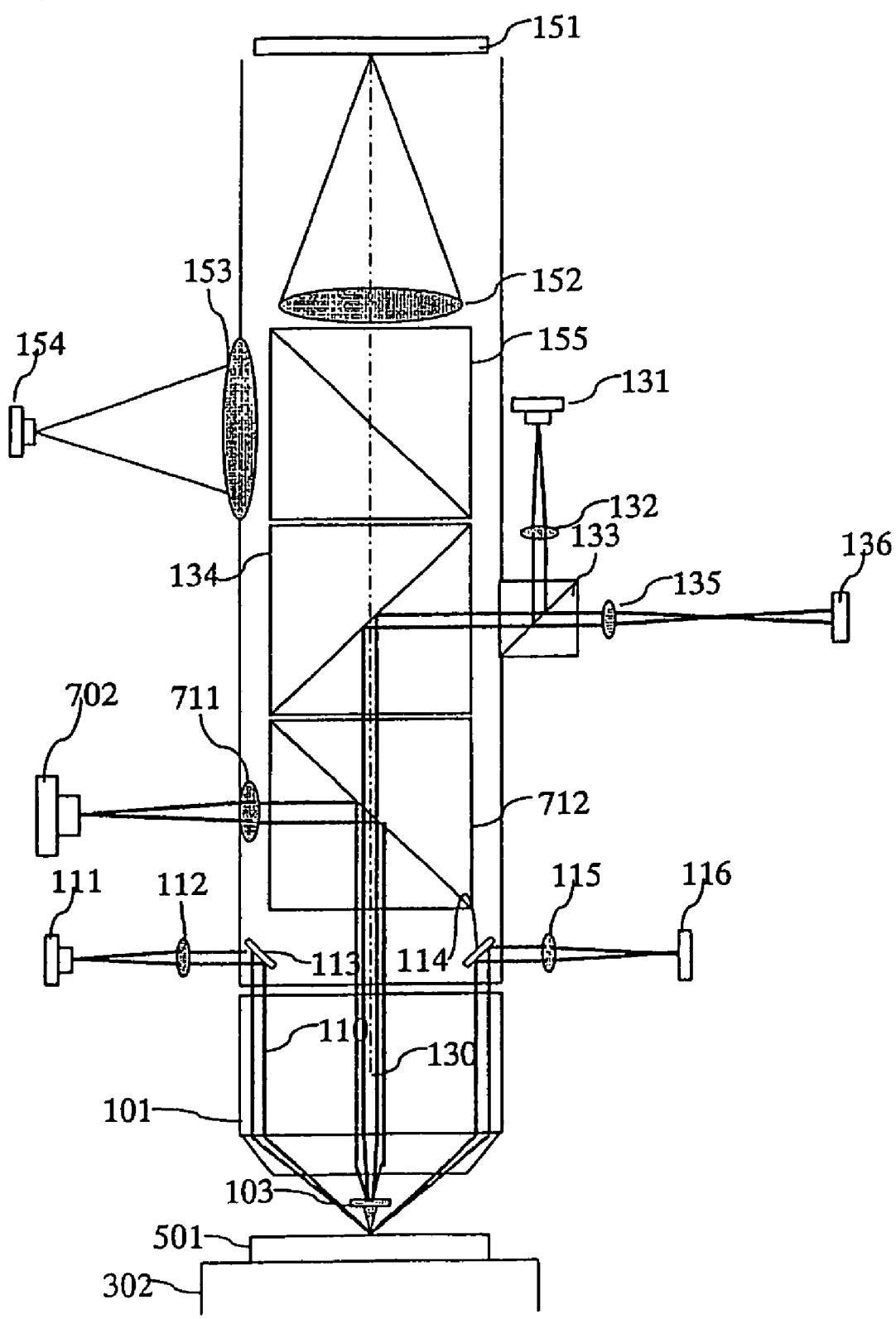
FIG. 9 illustrates a further optical system according to Embodiment 5 of the present invention.

FIG. 9 shows an optical system according to Embodiment 5 of the present invention. FIG. 9 shows a method of performing probe contact condition detection using the principles of an optical lever instead of laser interference. The light emitted from a light source 131 passes through a lens 132 and beam splitter, further passes through a beam splitter 134 and a dichroic mirror 712, passes through an objective lens and is irradiated onto a cantilever section 103 of the probe. The light reflected here goes back through the same path, passes through a beam splitter 133 and is irradiated onto a sensor 136 through a lens 135.

The lens 135 is constructed in such a way that the exit pupil of the objective lens and the sensor 136 have substantially the same image forming relationship, which causes a positional variation proportional to the inclination of the reflecting plane of the cantilever to be produced in the light on the sensor 136. By detecting this variation through a PSD (position sensitive device)/split-type photodiode/linear image sensor or the like located at position 136, it is possible to detect the inclination (flexure) of the cantilever.

Furthermore, using a two-dimensional PSD, image sensor or quadrant photodiode makes it also possible to detect torsion as well as flexure. Of these signals, by detecting vibration of a resonance frequency through the circuit, it is possible to detect a contact condition of the probe 103. In order to separate this detected light 130 from light of a sample observation system, it is preferable to emit a single color laser from the light source 131 and provide an interference filter before and after the lens 135 so as to let pass only this light.

To further increase efficiency, a dichroic mirror may be used for the beam splitter 134. Furthermore, a polarization beam splitter may be used as the beam splitter 133, the polarization direction of the laser 131 may be set to S polarization which is reflected by the beam splitter 133 and S polarization may be converted to circular polarization by placing a 1/4 wave plate (not shown) between the beam splitters 133 and 134, irradiated onto the reflecting plane of the probe 103, and the reflected light may be changed to P polarization again by the 1/4 wave plate and made to pass through the polarization beam splitter 133.

On the other hand, it is also certainly possible to consider an embodiment in an off-axis construction using an objective lens of a long operating distance, passing at least one of the sample height sensor and probe flexure sensor through a gap between the objective lens and sample to project/detect light from a diagonal direction. This will be described later using FIG. 10.

Furthermore, the method of detecting flexure of the probe 103 using a heterodyne interference method has been described as another construction, but as a specific construction of the optical system, a point light source of frequency f1 and point light source of frequency f1+Δf which is shifted by frequency f are placed at the position of the light source 131. For the placement of the point light sources, a laser beam may be condensed by a lens or an outgoing end of a fiber may also be placed here. The optical system is adjusted so that an image of this beam is formed at two points on the probe 103.

For example, as shown in FIG. 8, an image of one beam is formed at an end of the cantilever section of the probe and an image of the other beam is formed at the base. The reflected light beams cross each other at the position 136, and therefore if a photodiode is placed at 136, the two light beams interfere with each other, generating a beat of frequency Δf. When the phase of the beat signal is obtained through a lock-in detection using the signal of frequency Δf given to a frequency shifter as a reference, this phase change shows the change of the inclination of the cantilever.

This allows flexure of the cantilever to be detected. Or instead of using a signal given to the frequency shifter, it is also possible to detect light which has passed through the lens 132 without being reflected by the beam splitter 133 in a place where two beams cross each other using another photodiode (not shown) and use it as a reference signal of frequency Δf.

Furthermore, as another configuration, it is also possible to incorporate an instrument such as a strain gauge that can obtain a signal which reflects a distortion variation in the probe and use it as a substitute for an optical flexure sensor.

Embodiment 6

Figure 10:
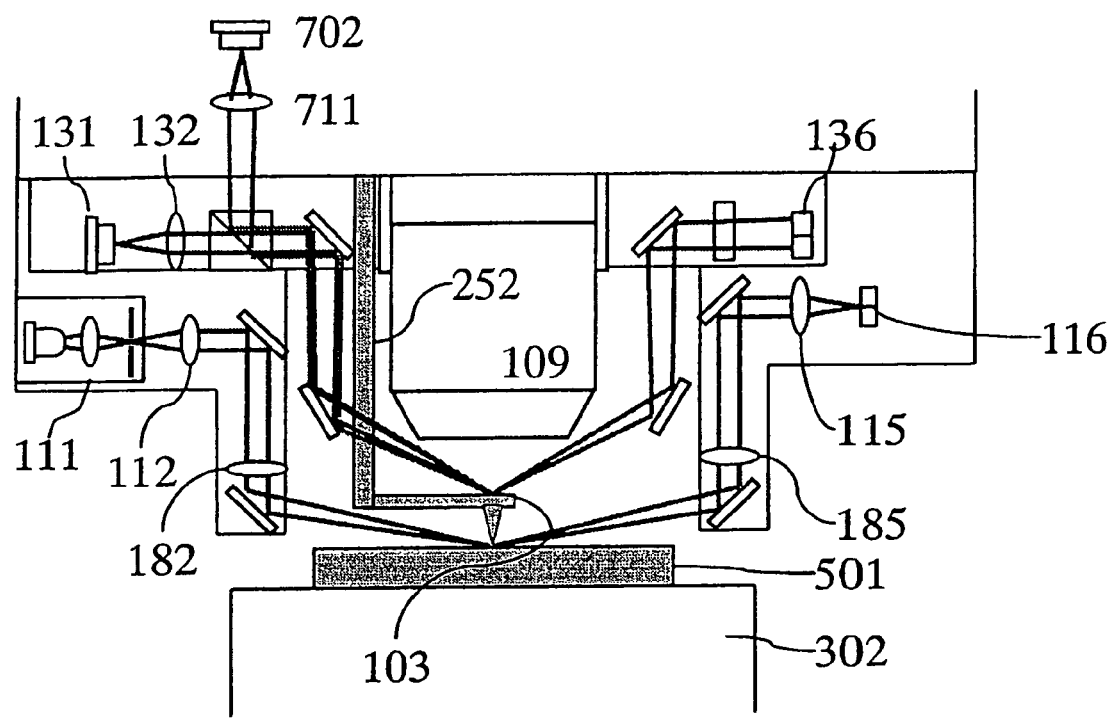
FIG. 10 illustrates a still further optical system according to Embodiment 6 of the present invention.

FIG. 10 shows Embodiment 6 of an optical system. Light emitted from a light source 111 is transformed to parallel light by a lens 112, reflected by a mirror 113, introduced into a lens 182 after being reflected by the mirror, and focused on a sample 501. Any shape of image such as a spot or slit can be formed depending on the shape of an opening incorporated in the light source 111. The light reflected by the sample is reflected by a mirror, passes through a lens 185 and an image thereof is formed on a detector 116 through an image forming lens 115. The position of the image is moved depending on the height of the sample 501. The amount of movement is expressed by $2mZ \sin \theta$, where $\theta$ is the angle of incidence of detection light 110 upon the sample, m is image forming magnification by the lens 115 and Z is the height of the sample, and therefore the height Z of the sample can be detected by measuring this amount of movement. The detector 116 needs only to be able to detect the position of the image, a PSD (position sensitive device)/split type photodiode/linear image sensor or the like may be used.

The probe flexure detection system according to Embodiment 6 in FIG. 10 will be explained. Light emitted from a light source 131 passes through a lens 132, reflected by a mirror and irradiated onto a cantilever section 103 of a probe. The light is reflected by a mirror and then irradiated onto a sensor 136. The flexure of the cantilever 103 becomes an angle variation of the reflected light and this causes the positional variation proportional to the inclination of the reflecting plane of the cantilever to be generated in the light on the sensor 136. The inclination (flexure) of the cantilever can be detected by detecting this positional variation using a PSD (position sensitive device)/split type photodiode/linear image sensor or the like at position 136.

Furthermore, using a two-dimensional PSD, image sensor or quadrant photodiode makes it also possible to detect torsion as well as flexure. In order to separate this detected light 130 from the light of a sample observation system, it is preferable to emit a single color laser from the light source 131 and provide an interference filter before the detector 136 so as to let pass only this light.

Reference numeral 109 denotes an objective lens of the sample observation system. This optical system may also be adapted such that reference light is guided through a different system before the detector 136 and a heterodyne or homodyne interference signal obtained from 136 is processed so as to detect the deformation or vibration condition of the probe.

Embodiment 7

Figure 11:
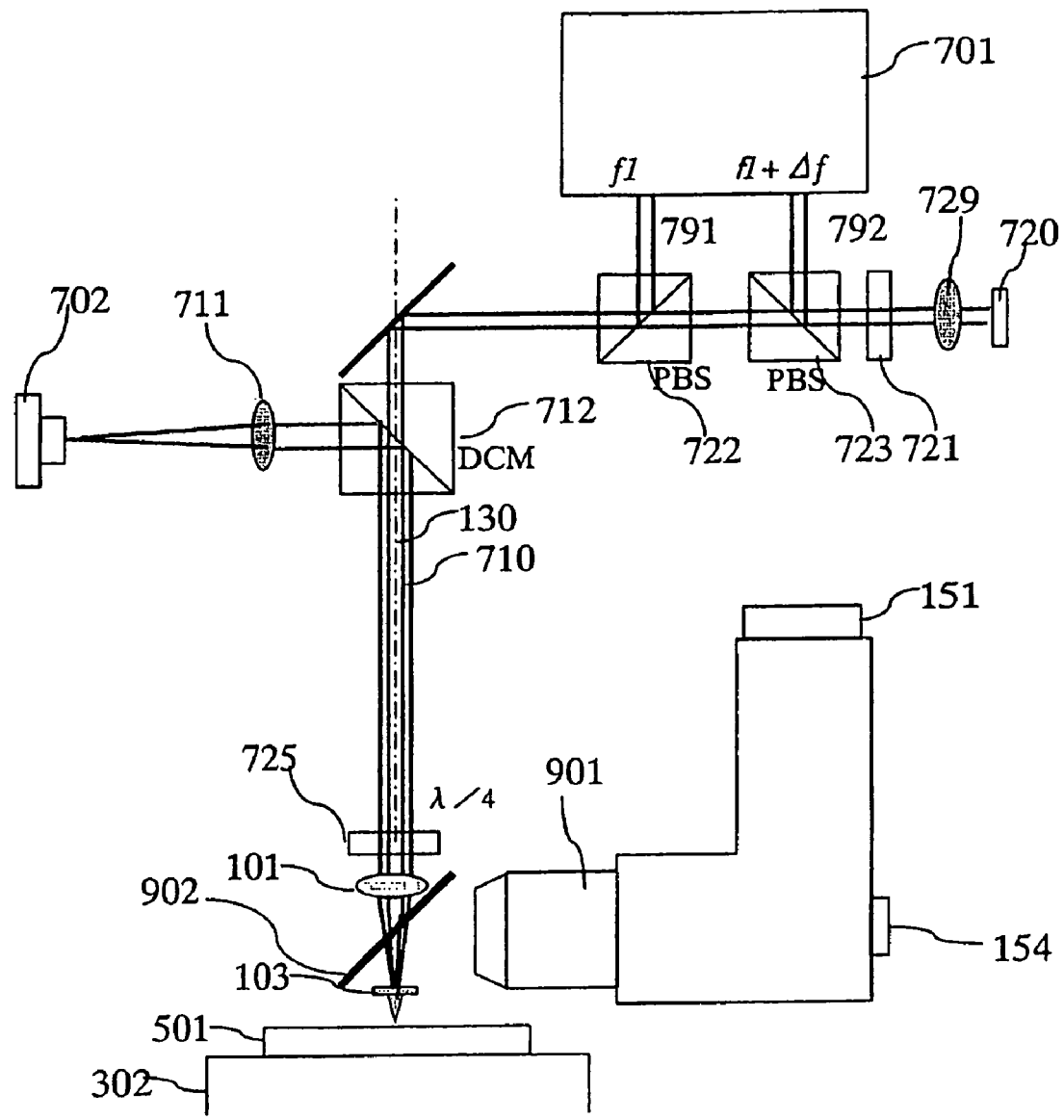
FIG. 11 illustrates a still further optical system according to Embodiment 7 of the present invention.

FIG. 11 illustrates further Embodiment 7 of the optical system. Compared to the embodiment explained in FIG. 6, an observation optical system is provided as a separate unit, light is bent by a half mirror 902 in the horizontal direction and a cantilever and sample are observed under illumination using an observation lens 901. The half mirror 902 is set behind the illumination light source 154 and 901 of the observation image sensor 151 in FIG. 6. Reference numeral 101 denotes a lens for vibration excitation of the probe and deformation detection, which has broader tolerance for requirements of aberration, and can thereby be a smaller lens than a dual-function lens which is also used for observation. The lens 101 is driven parallel to the movement of the probe 103 and always forms a laser spot on the probe 103.

The rest of configuration is the same as the configuration in FIG. 6 except in that the position of a 1/4 wave plate 725 is close to the lens 101. When the wave plate 725 is as close to an object to be measured as possible, it is possible to eliminate influences of diffused light in the middle of the optical path, and so the wave plate 725 is placed in this place. Furthermore, in this figure, deformation of the probe is measured using optical interference but it goes without saying that such a measurement can also be performed through optical lever detection as in the case of the Embodiment in FIG. 9.

Embodiment 8

Figure 12:
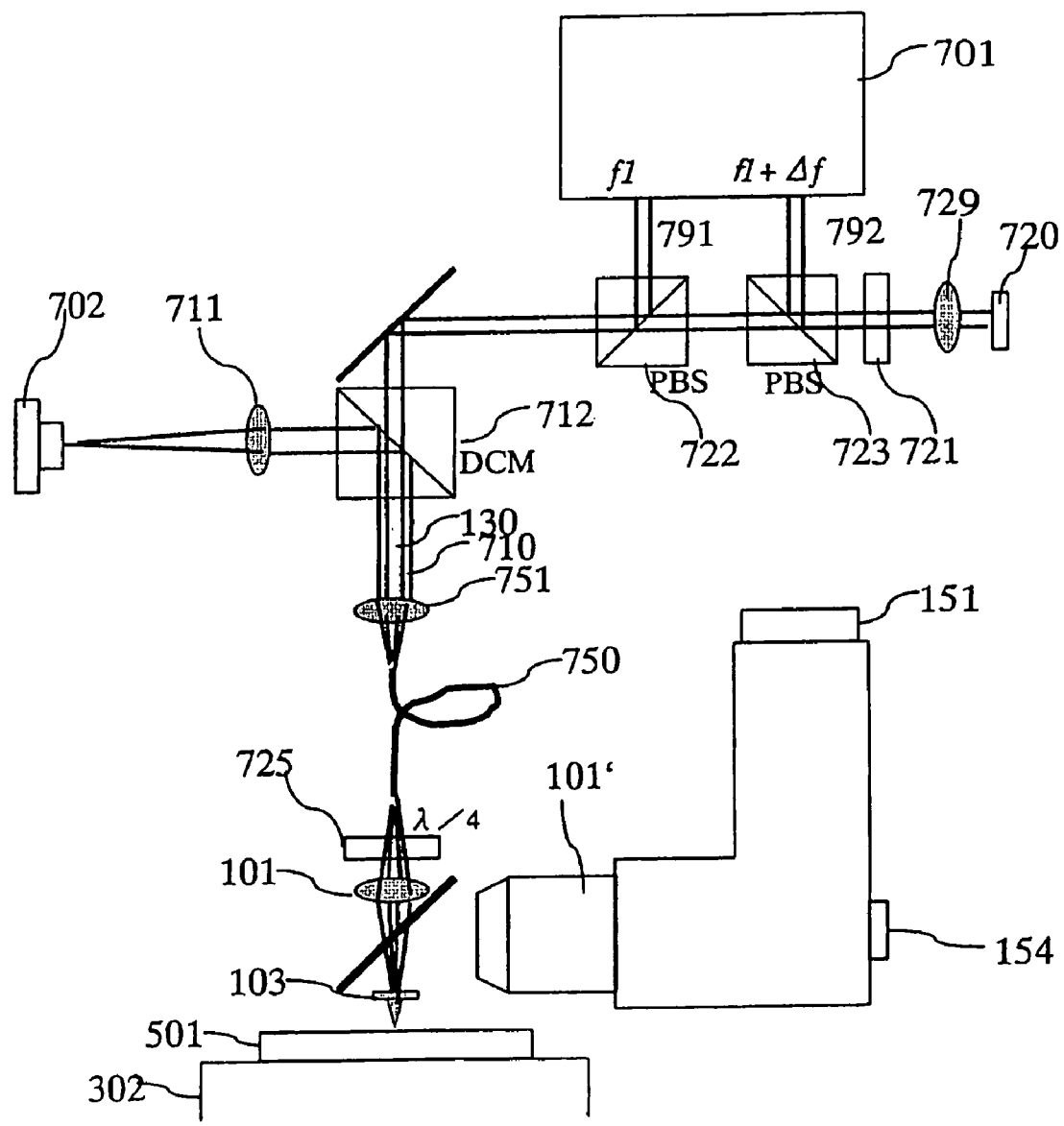
FIG. 12 illustrates a still further optical system according to Embodiment 8 of the present invention.

FIG. 12 is still further Embodiment 8 of the optical system. Compared to FIG. 11, vibration excitation light 710 and measurement light 130 are condensed by a lens 751 and introduced into a polarization maintaining fiber 750. The emitted light passes through a 1/4 wave plate 725, and an image thereof is formed by a lens 101 on a probe 103. The light reflected by the probe 103 goes back through the same optical path through the polarization maintaining fiber 750 and transformed to parallel light by the lens 751. The operation thereafter is the same as that in FIG. 11.

Embodiment 9

Next, an embodiment suitable for measurement of a sample with a high aspect ratio such as a semiconductor pattern will be explained using FIG. 3. In this way, a force gradient is generated substantially in the direction of the normal to the surface of the sample. As described above, the resonance frequency is shifted due to the force gradient and the contact condition is thereby detected, and therefore if the influences of a viscous force and frictional force acting between the tip of the probe and sample are relatively small, the sensitivity of contacting force detection increases when the direction of vibration of the probe substantially matches the direction of the force gradient. For this reason, as shown in the right figure of FIG. 3, when a steep slope is measured, the force gradient is in the horizontal direction, and therefore when detection sensitivity is small in probe vibration in the vertical direction or when the frictional force is strong, the wear of the probe and sample is large, which becomes problematic.

In such a case, if the vibration direction of the probe is switched leftward and rightward, it is possible to detect contact with high sensitivity and also reduce the wear of the probe and sample. Or by generating vibration in the vertical and horizontal directions simultaneously, detecting the vibration conditions in the respective vibration modes, it is also possible to detect not only the magnitude of the force gradient but also the force direction.

To generate vibration in two directions simultaneously, it is possible to superimpose signals of frequencies corresponding to both vibration modes and give the superimposed signal to vibration excitation light 702 or a probe drive section 202 and select signals of the respective frequencies using filters to detect the vibration condition. Furthermore, instead of superimposing signals of two frequencies, it is possible to excite probe vibration of one frequency using vibration excitation light and that of the other frequency using an excitation method different from that of the probe drive section. From the above described embodiment, it is possible to measure the steep slope of a high aspect ratio pattern accurately without slippage or wear.

Embodiment 10

Figure 13:
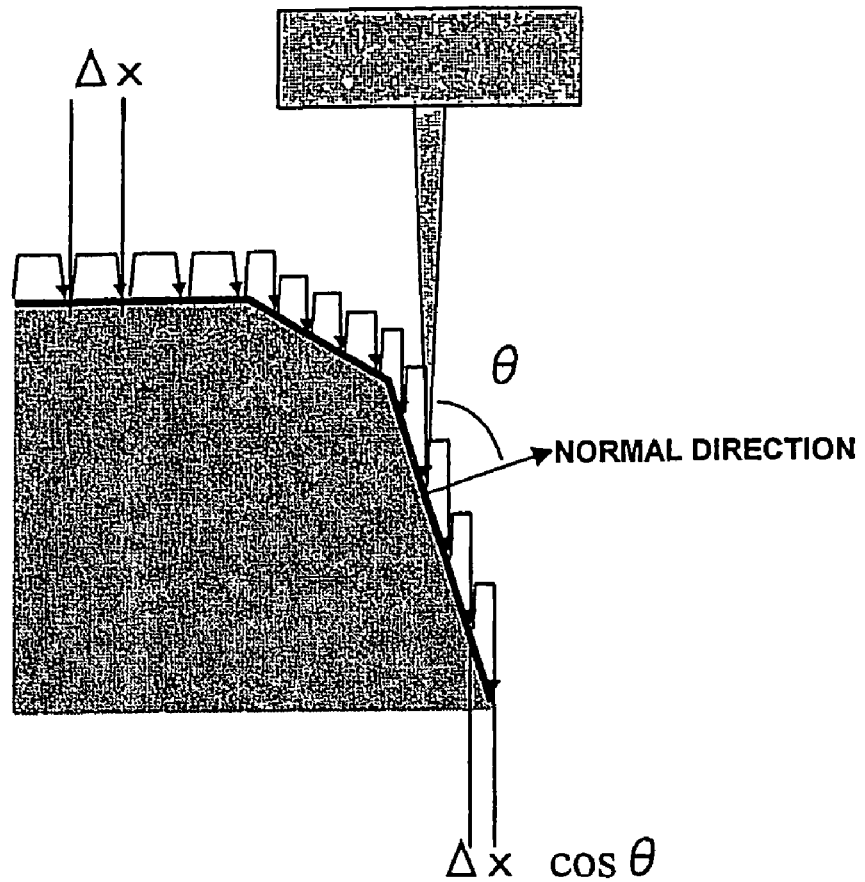
FIG. 13 illustrates an example where the measuring step of the probe is changed by the inclination of the sample according to Embodiment 10 of the present invention.

FIG. 13 shows Embodiment 10. As shown in FIG. 13, to measure the shape of the inclined section in detail, it is also possible to consider an embodiment of taking the next measuring point minutely depending on the direction of the force gradient or local inclination of the shape to be measured.

More specifically, the probe is moved to the next measuring point at intervals of p+Δx cos θ, where Δx is a scanning interval on the horizontal plane according to an angle θ (angle in the vertical direction is considered 0) in the direction of the local normal to the surface of the sample.

Here, p is a correction term indicating a minimum pitch. Furthermore, as a still further embodiment, when θ is very large, for example, 80 degrees or higher, the probe descending direction is too close to the direction of the slope to lower the probe stably. In such a case, the probe is made to descend with a relatively large p in the case of the descending inclination, the descent of the probe is stopped at a point at which the probe descends from the previous measuring point by Δx or Δx sin θ, the probe is moved in the left direction until contact is detected here and the position of the point at which contact is detected is measured. On the contrary, in the case of the ascending inclination, the probe is moved in the left direction by p, the probe is then lifted by Δx or Δx sin θ, the probe is moved in the right direction until contact is detected here and the position of the point at which contact is detected is measured.

By so doing, it is possible to measure the shape of the slope accurately even when the slope overhangs at θ exceeding 90 degrees.

Embodiment 11

Furthermore, the tip of the probe has a certain tapering angle and the shape of a step location steeper than this cannot be conventionally measured accurately using a scanning probe microscope, but when a step is detected, scanning is performed with the probe inclined. Examples of methods of inclining the probe include a method of providing a minute rotation mechanism in a holder of the probe and also a method of using a piezoelectric thin-film cantilever shown in FIG. 14 as disclosed in "T. R. Albrecht, S. Akamine, M. J. Zdeblick, C. F. Quate, J. Vac. Sci. Technol. A8(1), 317 (January/February, 1990)."

There is a so-called bimorph structure, piezoelectric substances are provided above and below an intermediate electrode G, and electrodes A, B, C and D are formed on the opposite sides thereof. Here, when voltage variations in opposite directions are given to A-G, D-G and B-G, C-G, torsion deformation is generated and the probe can be inclined. The torsion of the probe can be easily detected using a quadrant photodiode for the flexure detector 136 of the probe.

Embodiment 12

Furthermore, carbon nanotube is becoming a focus of attention as a thin, highly resistant probe material in recent years. This is a material made of columnar carbon atoms on the order of nanometer to 10 nanometers. Using this carbon nanotube provides a possibility of accurately measuring stepped shapes of steep inclination using a scanning probe microscope, but it is not possible to measure step locations with an overhang of 90 degrees or above. Furthermore, when the angle of the probe is similar to the angle of a step location, there is a problem that the probe is attached to the step location of the sample and bent with an electrostatic force, making it impossible to measure the accurate shape.

Figure 15:
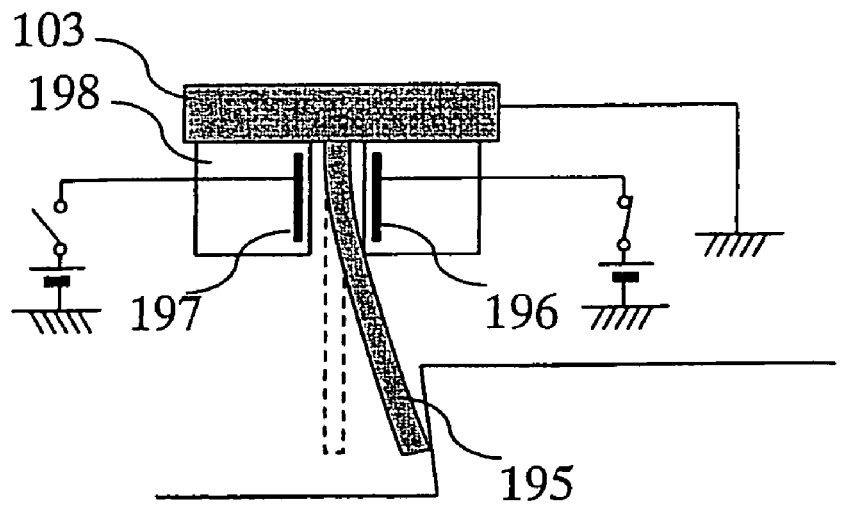
FIG. 15 illustrates an example of the structure of the probe whose inclination is controllable according to Embodiment 12 of the present invention.

On the contrary, FIG. 15 shows an embodiment of accurately measuring a step location by bending a carbon nanotube with an electrostatic force. Reference numeral 195 denotes a carbon nanotube. Electrodes 197 and 196 are provided on the left and right sides of this carbon nanotube and the surroundings of the electrodes are covered with an insulator 198. When a voltage is applied to any one of the electrodes 197 and 196, the carbon nanotube 195 is attracted and bent by the electrostatic force.

Figure 16:
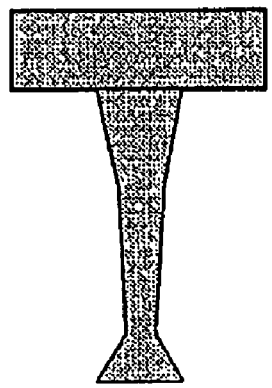
FIG. 16 shows an example of the structure of the probe applicable to an overhang.

In the example in FIG. 15, a voltage is applied to the electrode 196. This makes it possible to accurately measure a step location of steep inclination. It is also possible to consider a structure having an expanded tip for an overhang probe as shown in FIG. 16.

Embodiment 13

Figure 17:
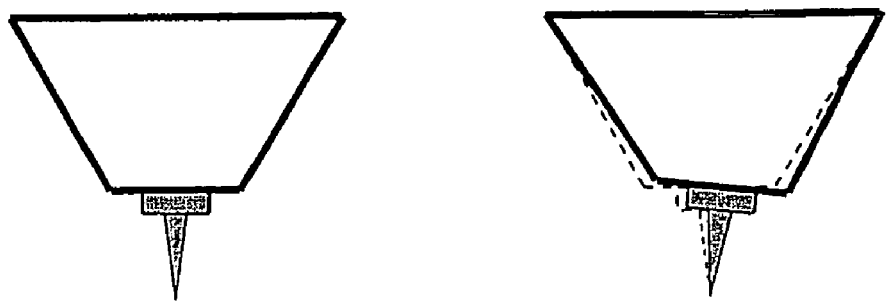
FIG. 17 illustrates a further example of the structure of the probe whose inclination is controllable according to Embodiment 13 of the present invention.

As a still further embodiment, it is also possible to compose a probe holder section with a link mechanism as shown in FIG. 17. It is desirable to compose a link node with an elastic hinge so as to be free of backlash. At this time, when the link is deformed as shown in the right figure of FIG. 17, it is possible to change only the inclination instead of changing the position of the tip of the probe.

Embodiment 14

Figure 18A:
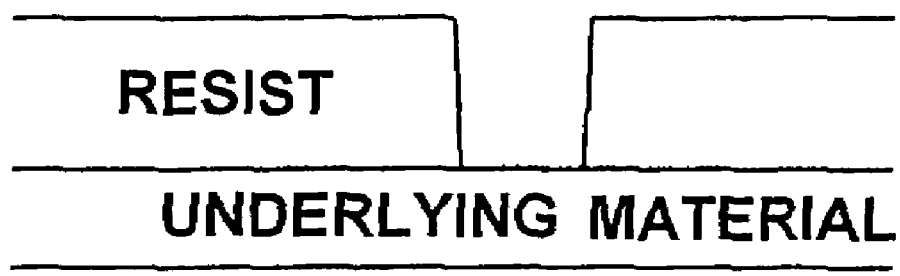
FIG. 18A, FIG. 18B and FIG. 18C illustrate examples where a resist pattern according to Embodiment 14 of the present invention can be distinguished.
Figure 18B:
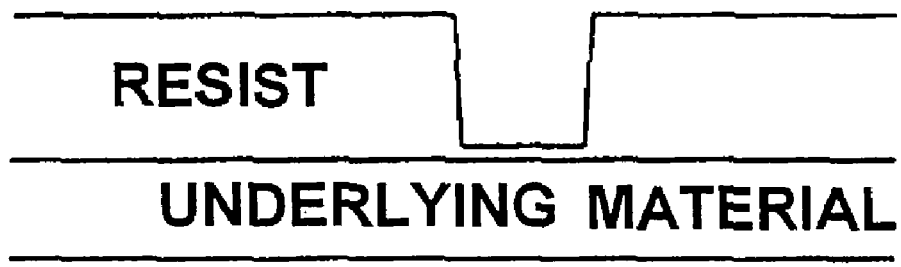
Figure 18C:

FIG. 18A, FIG. 18B and FIG. 18C show an example of measuring a resist pattern according to Embodiment 14 of the present invention. When measuring a resist pattern, it is necessary to distinguish whether the pattern is cut vertically as shown in FIG. 18A or the resist remains as a thin layer as shown in FIG. 18B or the lower part of a groove or a hole is narrowed as shown in FIG. 18C. According to the present invention, the probe is excited, and it is possible to detect the differences in the material and distinguish them by detecting the phase of vibration.

Embodiment 15

Figure 19:
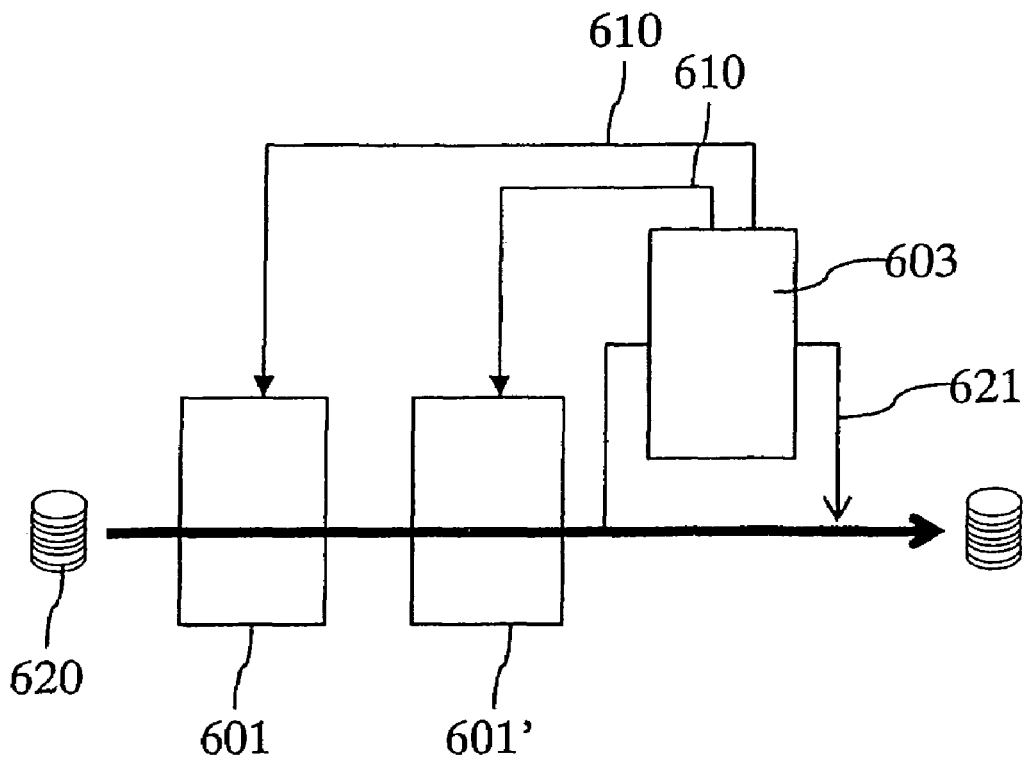
FIG. 19 illustrates an example of performing condition control of semiconductor processes according to Embodiment of the present invention.

FIG. 19 shows a device manufacturing method according to Embodiment 15 of the present invention. Wafers 620 are sent to process devices 601, 601' to form a device. The process devices 601, 601' may be an etcher, CMP device, exposure device or developing device. Using sampled wafers or dummy wafers 621 that have undergone these processes, patterns formed on the wafers are observed/measured using a scanning probe microscope 603 of the present invention. Or since the throughput is large, all wafers may be observed/measured using the scanning probe microscope 603 of the present invention.

According to Embodiment 15 of the present invention, it is possible to observe/measure the three-dimensional shape or distribution of the surface condition of a pattern accurately without damaging the sample, and therefore by feeding back the observation/measurement result to the process conditions of the process devices 601, 601', it is possible to manufacture a high accuracy device stably. Depending on circumstances, a dedicated data processing server (not shown) may also be inserted in a feedback path 610.

Embodiment 16

Figure 20:
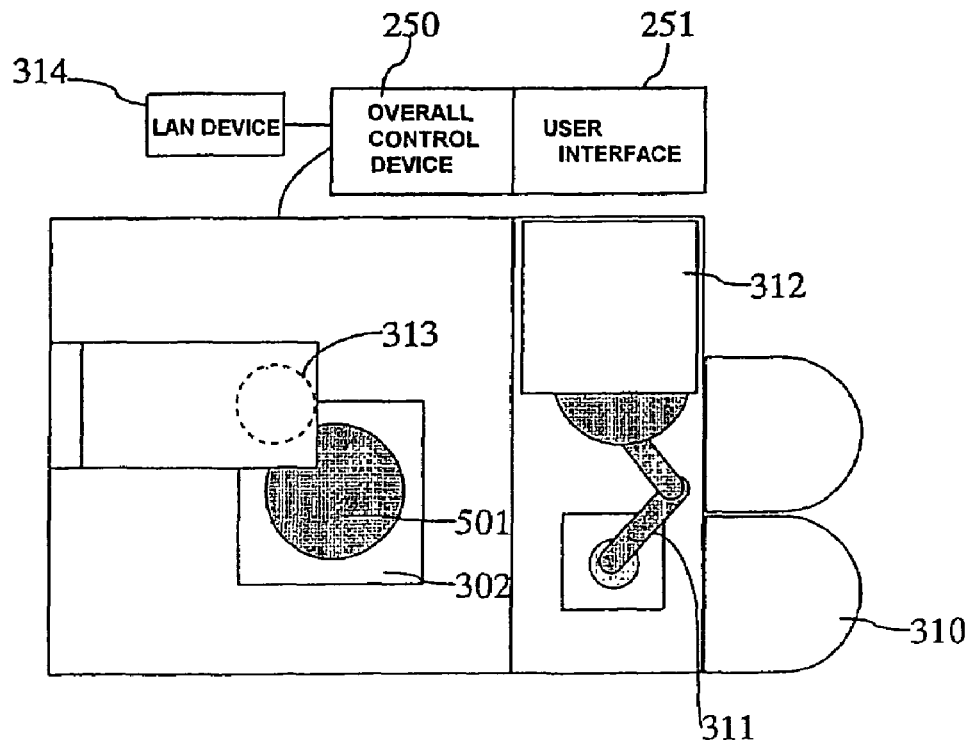
FIG. 20 illustrates the construction of the device when a semiconductor wafer is measured according to Embodiment 16 of the present invention.

FIG. 20 shows the overall construction of a manufacturing apparatus which is Embodiment 16 of the present invention. Reference numeral 313 denotes a detection head section including an objective lens 109, a probe 103 and a drive system thereof and a detection system. Measurement is performed with a sample 501 placed on a stage 302. Reference numeral 310 denotes a mount on which a cassette with a substrate is placed, a robot arm 311 picks up the substrate from here and after detecting the rotation angle of the substrate by a prealigner 312 the robot arm 311 places the substrate on the stage 302 so as to be oriented in a predetermined direction and performs measurement. The operation of the overall device is controlled by an overall control device 250 and it is possible to receive instructions of the operator or present an optical image or SPM image using a display/input device 251. Furthermore, the overall control device 250 may be connected to a LAN device to exchange measured data or the like.

After mounting the substrate on the stage 302 such that a sample 501 is placed in a predetermined direction, a plurality of positioning marks on the substrate are observed using the objective lens 109 and the position/rotation of the substrate is accurately measured (aligned). Based on this information, the substrate is moved to a registered measuring position and measurement is started. First, the probe is made to descend and contact the substrate. Next, scanning (SPM scanning) is performed using the scanning probe microscope and measured data is obtained. Every time the probe is retracted and returned to the next measurement position, the above described operation is repeated until measurement at all specified measuring points is completed. When measurement at all specified measuring points is completed, the stage is moved to an unloading position, the robot arm 311 picks up the substrate, stores it in a cassette, and measurement of one substrate is completed in this way.

The present invention enables approaching of the probe and SPM scanning to be performed at a high-speed, and can thereby shorten a total time required for measurement.

Embodiment 17

Next, using FIG. 2A, FIG. 2B and FIG. 2C, Embodiment 17 for realizing higher-speed measurement with a variable retraction distance of the probe will be shown. As shown in FIG. 2A, it is conventionally required to take a retraction distance equivalent to or greater than a maximum step of a sample and approach the next measuring point to realize accurate measurement of the step. In contrast, when a stepped structure of an object such as a semiconductor pattern is known to a certain degree, it is possible to take advantage of this to reduce the probe distance as shown in FIG. 2B.

In this way, it is possible to shorten the overall scanning time by limiting the retraction distance to a minimum necessary distance to detach the probe from the sample when the probe is scanning a high plane of the sample and taking the retraction distance with a certain degree of margin with respect to the step of the sample when the probe is scanning a low plane of the sample.

Embodiment 18

Furthermore, as still further Embodiment 18, as shown in FIG. 2C, a method of always keeping the retraction distance of the probe to a minimum necessary distance to detach the probe from the sample and temporarily increasing the retraction distance when a step location is detected is proposed. As shown in this FIG. 2C, a method of detecting a lateral stress will be shown as Embodiment 18 of the method of detecting a step location.

The construction whereby a longitudinal stress and lateral stress of a probe are detected simultaneously has already been described. Using this, when a lateral stress is detected at a step location, this is judged that the probe is scanning while running upon the step and re-approach is made with an increased amount of retraction. Though the accuracy degrades to a certain degree, it is also possible to consider a method of increasing the amount of retraction at the time of measurement at the next point without performing re-measurement, thus avoiding re-measurement at the same point.

Furthermore, it is also possible to adopt a method whereby when a measured height changes in a direction in which a certain rate of change is exceeded, it is judged that the probe is approaching a step location and the retraction distance is increased. Since the minimum necessary distance to break off the adhesion varies according to the conditions of the sample and probe, it is possible not to fix the retraction distance and to detect the adhesion break off using a phenomenon in which the probe vibration state is recovered when the field of a force around the probe disappears at the time of adhesion break off.

This Embodiment 18 has explained that the probe is driven, but what is important here is relative driving of the probe with respect to the sample and the construction with the X, Y, Z-axes on the probe side is not a precondition. For example, it goes without saying that the discussions in this embodiment are also held in the construction with the X and Y-axes or with the X, Y, Z-axes on the sample side.

Embodiment 19

Figure 14:
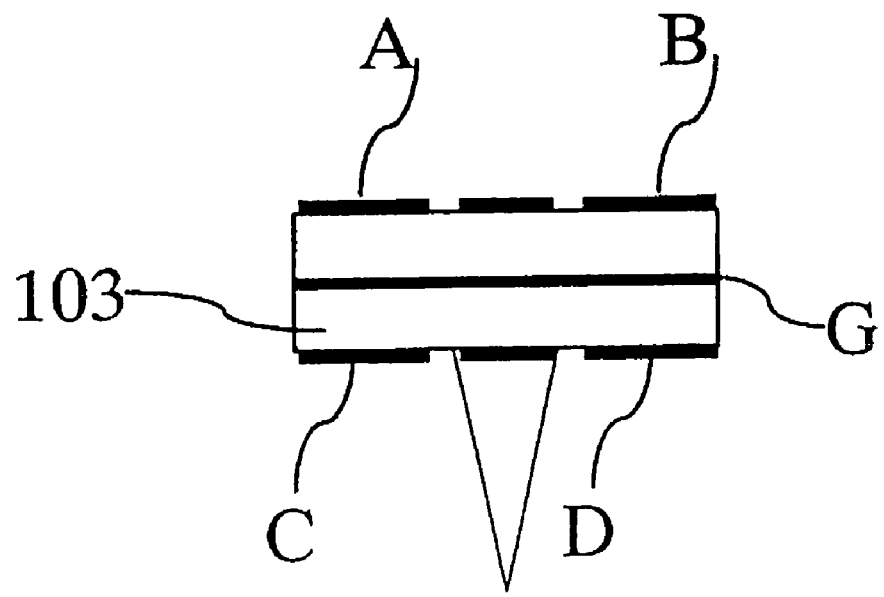
FIG. 14 illustrates another example of the structure of the probe whose inclination is controllable according to Embodiment 11 of the present invention.
Figure 21:
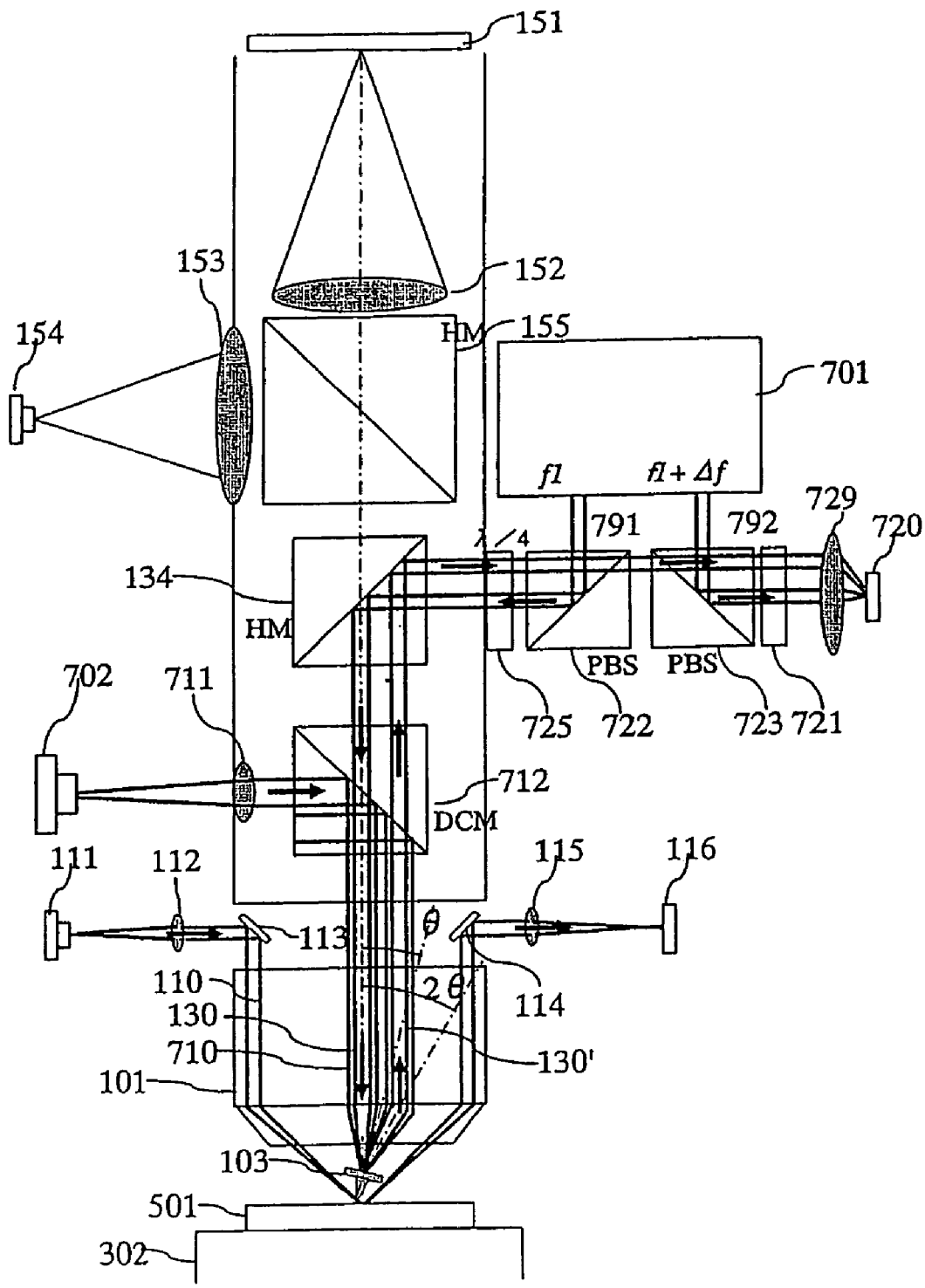
FIG. 21 illustrates an optical system adaptable to the inclination of the cantilever according to Embodiment 19 of the present invention.

Next, Embodiment 19 where a difference in the optical path due to an inclination of the probe is absorbed will be described below. From among the methods of inclining the probe, according to not only the method of bending only the probe section shown in FIG. 15, but also the construction as shown in FIG. 14, FIG. 17 where the cantilever section itself to which the probe is attached is inclined or the construction where a tip of the cantilever section is twisted, the optical path of detected light irradiated onto the back of the cantilever is inclined, preventing light from reaching the detector. For this reason, it is necessary that even if the optical path of detected light is inclined, detected light be enabled to reach the detector. An embodiment for this purpose will be explained below. FIG. 21 shows the construction of the same optical system as that in FIG. 6. However, this figure is shown with scales of optical parts changed to indicate shifts in the optical path due to an inclination of the probe. When a cantilever 103 is inclined by an angle θ, reflected light 130' of detected light 130 irradiated onto the cantilever 103 is inclined by 2θ. This light passes through a lens 101 having a focal length f and then passes through an optical path 130' which is deviated by approximately fθ from the optical path of projected light 130 and is directed to a detector 720 through mirrors 712, 134, 722, 721. At this time, by placing a lens 729 in front of the detector 720 such that the focus position of 729 substantially matches the photosensitive surface of the detector 720, detected light and reference light superimpose with each other on the detector 720 as shown in the figure, whereby even if the cantilever 103 is inclined and reflected light is thereby inclined, it is possible to produce interference. For example, to respond up to an overhang of 5 degrees of an upper step location on a sample 501, suppose the probe is inclined up to θ=10. The inclination of the reflected light 130' in this case becomes 2θ=20 degrees, and if the converging angle when detected light is irradiated is ±α=3.5 degrees, marginal light of the detected light 130' is inclined up to 2θ+α=23.5 degrees and a numerical aperture (NA) of the lens 101 needs to be sin(2θ+α)=0.4 or more. Furthermore, at this time, the spot size of the detected light on the cantilever 103 is determined by the converging angle α and if the wavelength of the detected light is assumed to be λ=0.63 μm, the wavelength may be narrowed down to approximately λ/2 sin θ=5.2 μm.

Embodiment 20

Figure 22:
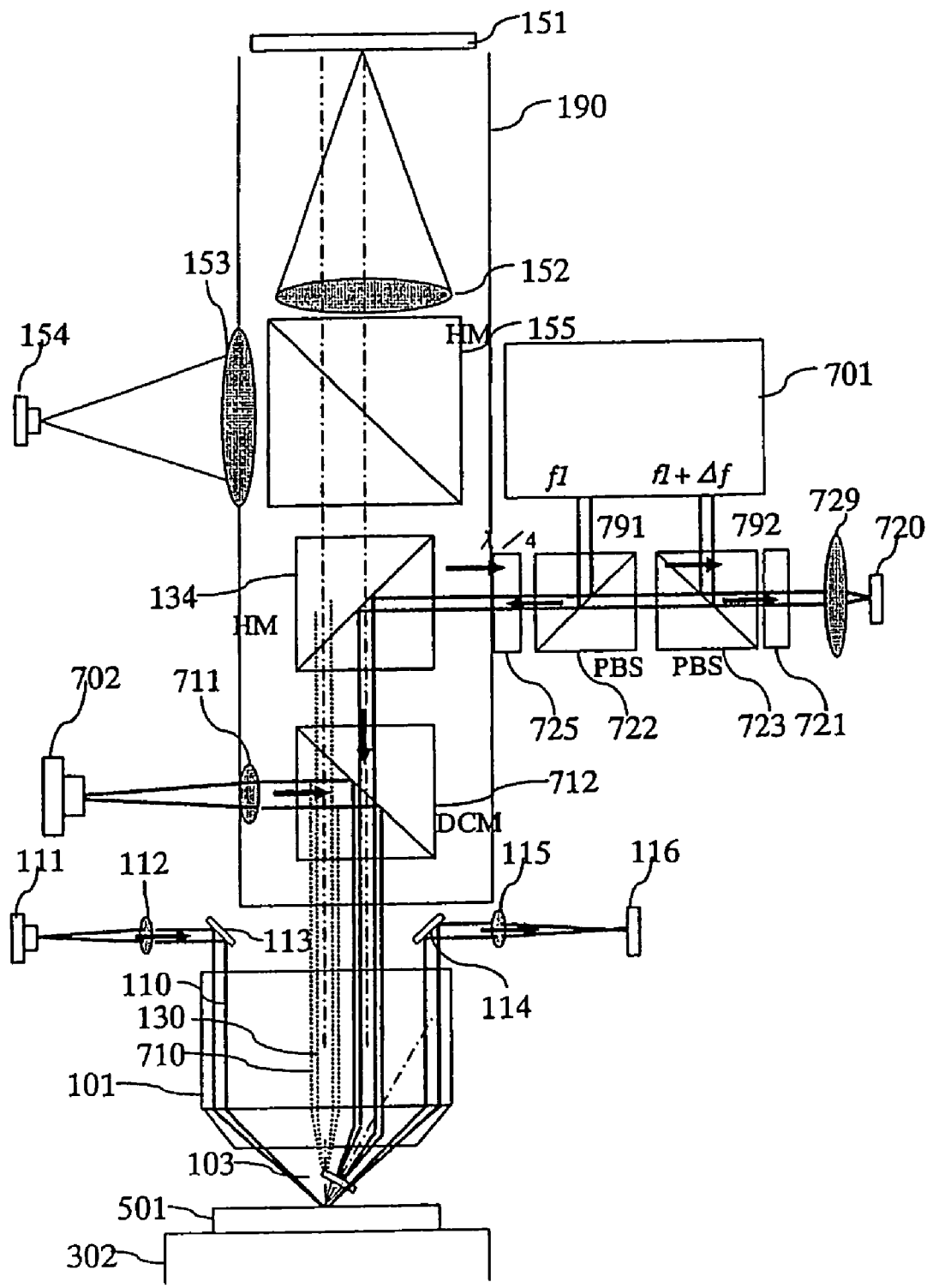
FIG. 22 illustrates an optical system adaptable to the inclination of the cantilever according to Embodiment 20 of the present invention.

Next, an embodiment of another detection system applicable to probe inclination will be explained using FIG. 22. A lens barrel 190 is shifted by θf in the horizontal direction according to an inclination θ of a cantilever 103. Here, f denotes a focal length of a lens 101. In this way, the optical path of detected light 130 incident upon the lens 101 is shifted by fθ, the illuminating angle with respect to the cantilever 103 is inclined by θ and the illuminating angle is inclined as much as the inclination of the cantilever 103, which causes the reflected light to go back through the original optical path which is inclined by θ and guided to a detector 720 through substantially the same optical path as that before the probe is inclined. In this way, the maximum inclination of the optical path becomes approximately half from 2θ+α to θ+α compared to Embodiment 19 shown in FIG. 21, capable of covering up to a large probe orientation. For example, if it is assumed that the numerical aperture (NA) of the lens is 0.4 and the converging angle of the detected light is α=3.5 degrees, the probe can be inclined up to θ=arc sin(NA)−α=20 degrees. When the probe is placed with an additional margin of 5 degrees with respect to the angle of the side wall, an overhang of the side wall that can be provided by inclining the probe by 20 degrees is 15 degrees. In this case, detected light 791 and reference light 792 are superimposed with each other on 720 with no necessity for a lens 729, and so lens 729 may be eliminated but the lens 729 may also be used to absorb a slight deviation of the optical path caused by a probe variation or probe scanning.

In the figure, the case where the probe is inclined rightward to measure the right side of the side wall, but for a leftward side wall, the probe may be inclined leftward and the lens barrel 190 may be shifted by θf in the left direction accordingly.

Embodiment 21

Figure 23:
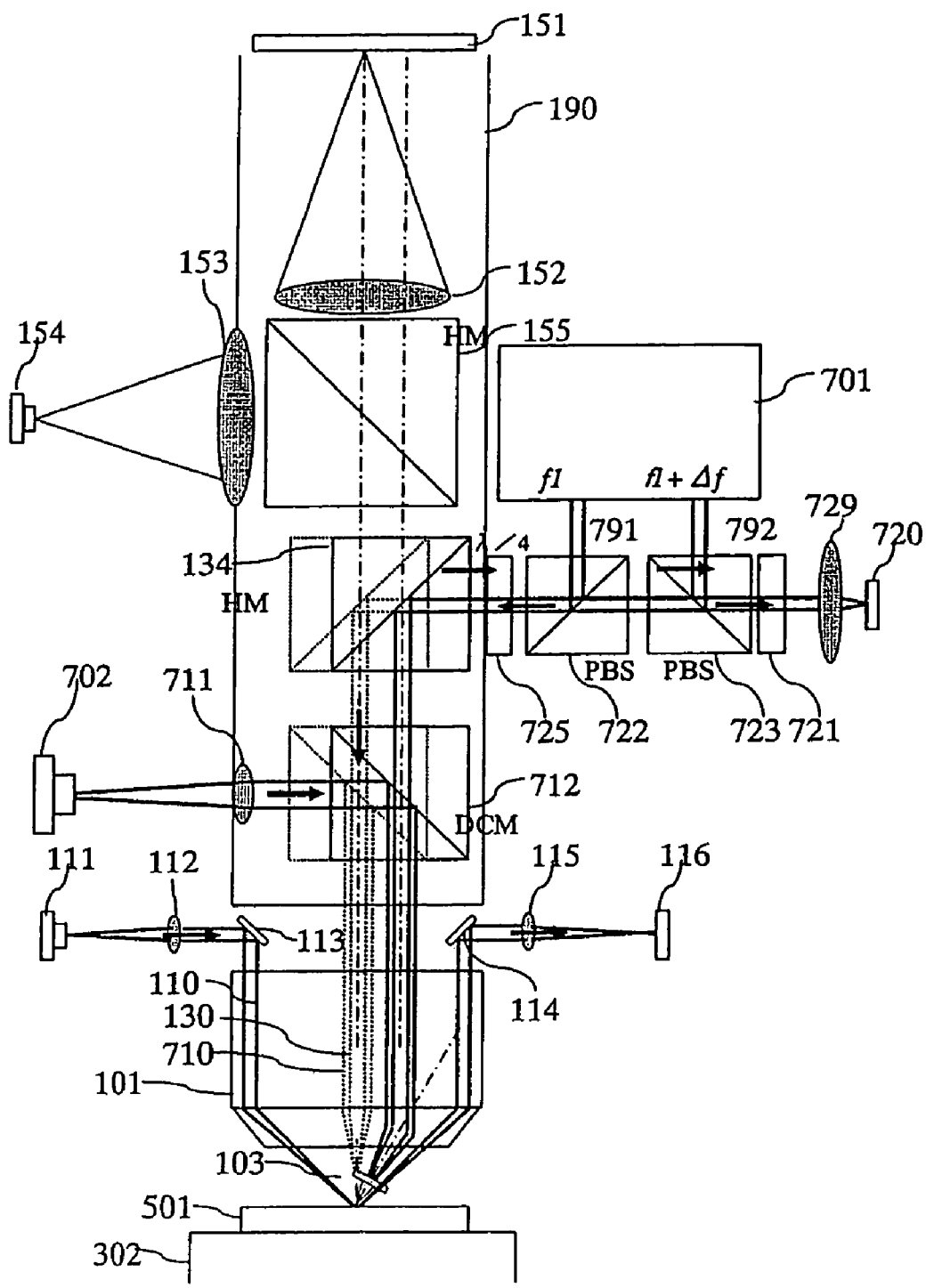
FIG. 23 illustrates an optical system adaptable to the inclination of the cantilever according to Embodiment 21 of the present invention.

Next, Embodiment 21 which is a slightly modified version of Embodiment 20 explained using FIG. 22 will be explained using FIG. 23. According to Embodiment 21 in FIG. 22, the whole lens barrel 190 is moved to the right or left according to the inclination of the probe, but it is also possible to move only prisms 134 and 712 to the right or left instead. Moving the prism 134 allows the illuminating angle of the detected light 130 to oscillate rightward or leftward in accordance with the inclination of the probe. On the other hand, moving the prism 712 allows the illuminating angle of the excitation light 710 to oscillate rightward or leftward in accordance with the inclination of the probe. However, the excitation light 710 needs not detect reflected light after irradiation onto the cantilever 103 and needs not always be oscillated rightward or leftward in accordance with the inclination of the probe, and therefore the prism 712 needs not be made movable.

Embodiment 22

Figure 24:
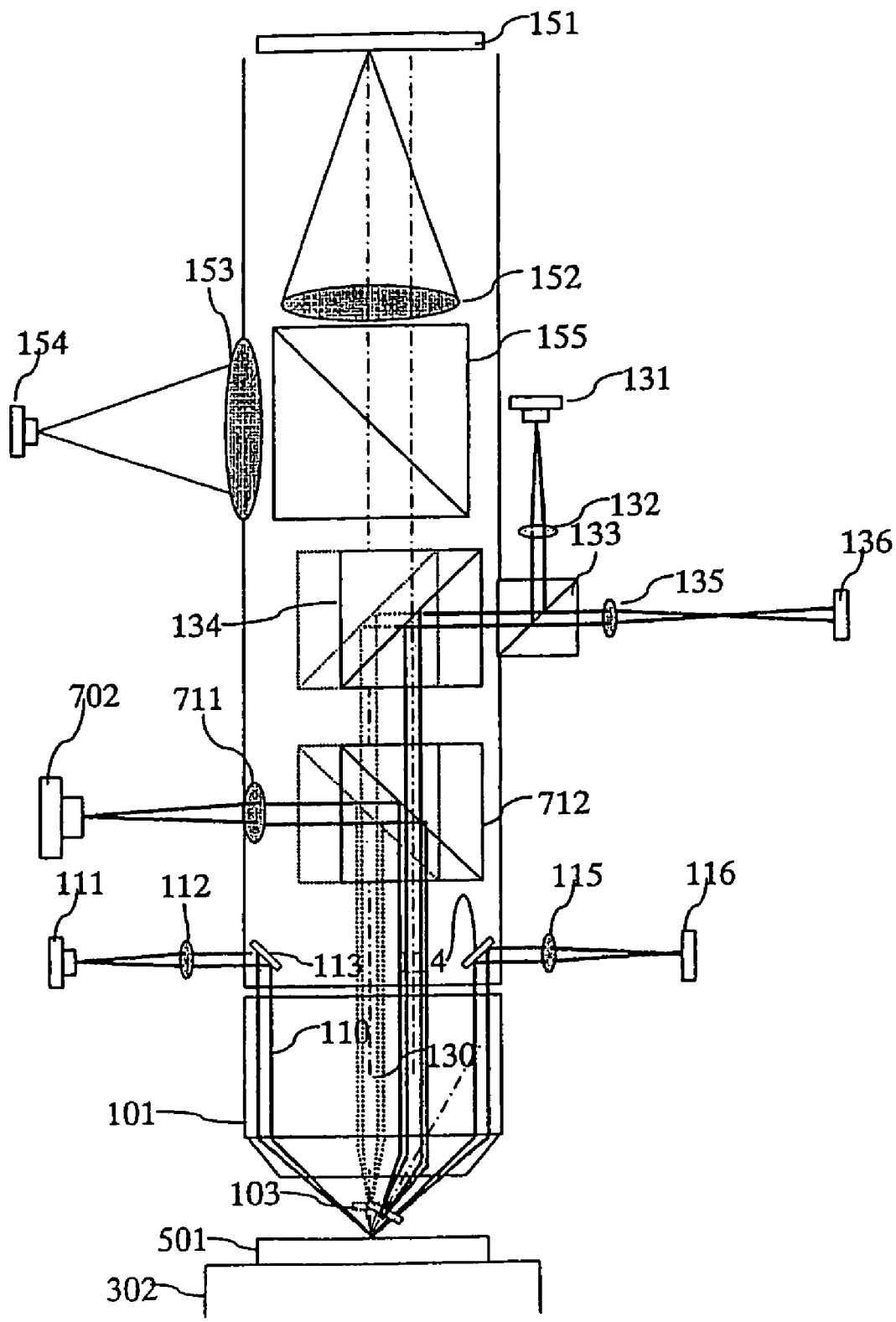
FIG. 24 illustrates an optical system adaptable to the inclination of the cantilever according to Embodiment 22 of the present invention.

Next, a method of detecting a probe contact condition of a cantilever using an optical lever will be explained as still further Embodiment 22 using FIG. 24. The overall construction has already been explained in FIG. 9, but when prisms 134 and 712 are moved to the right or left as in the case of FIG. 23, it is possible to change the illuminating angle when detected light emitted from a light source 131 is irradiated onto the cantilever in accordance with an inclination θ of the cantilever. Through the movement of the prism 134, the position of detected light on a sensor 136 is also kept substantially constant. For this reason, even when the inclination of the cantilever is changed, it is possible to keep the returning position of detected light to the substantial center of operation of the sensor 136 and thereby always detect minute flexure of the cantilever based on the principles of an optical lever.

Embodiment 23

Next, still further Embodiment 23 applicable to probe inclination using the polarization maintaining fiber explained in FIG. 12 will be explained using FIG. 25A and FIG. 25B. FIG. 25A shows a method of absorbing an inclination 20 in the reflection direction by an inclination θ of the probe as in the case of the embodiment explained in FIG. 21 using a lens of a large numerical aperture (NA). FIG. 25B shows an embodiment where an end of an optical fiber 750, a wave plate 725, a lens 101 and a cantilever 103 are inclined by θ as a single unit taking advantage of features of a flexible optical fiber. Since a relative positional relationship between them remains unchanged, a conjugate relationship between the end of the optical fiber and cantilever is always maintained and the light irradiated onto the cantilever goes back to the optical fiber 750 irrespective of the inclination of the cantilever. Furthermore, in these FIG. 25A and FIG. 25B, there is only one lens 101, but it is also possible to use two or more lenses so as to sandwich the wave plate 725. By so doing, it is possible to make a light beam passing through the wave plate substantially convergent light, and a polarization rotation effect by the wave plate can be obtained more accurately, which is preferable.

According to the present invention, a probe provided with a proximity sensor is made to contact a soft, brittle material or a pattern with steep steps intermittently and the probe is inclined and it is possible to thereby measure the shape with high accuracy. Using this system for measurement of the shape of a semiconductor circuit pattern, it is possible to produce a semiconductor product including minute circuits quite stably.

What is claimed is:

1. A scanning probe microscope provided with a drive mechanism that controls a mutual positional relationship between a sample stage on which a sample is placed and a probe, and a sensor that measures a deformation condition of the probe for measuring a surface distribution of the sample including a three-dimensional surface shape of the sample, comprising:

a vibration unit for vibrating the probe with a minute amplitude of an order of 1 nm and at a high frequency of at least 400 kHz; and a detection unit for detecting a contact condition between the probe which is vibrated with the minute amplitude and at the high frequency and the sample, wherein the probe is separated from a surface of the sample by the drive mechanism, moved close to a next measuring point and then the drive mechanism continues operations of bringing the probe closer to the sample until the detection unit detects a certain contact condition with respect to the sample surface.

2. The scanning probe microscope according to claim 1, further comprising a control unit for analyzing a condition of contact between the probe and the sample surface by detecting a vibration signal of the probe to thereby control an amount of lifting of the probe to a minimum value.

3. The scanning probe microscope according to claim 1, wherein the vibration unit vibrates the probe in the substantially vertical and/or substantially horizontal directions with respect to the surface of the sample stage.

4. The scanning probe microscope according to claim 1, wherein the vibration unit excites vibration of the probe through intensity modulation of light irradiated onto the probe.

5. The scanning probe microscope according to claim 1, wherein the detection unit detects vibration of the probe using interference of laser light irradiated onto the probe.

6. The scanning probe microscope according to claim 1, wherein the detection unit detects vibration of the probe using a variation of an angle of reflection of light irradiated onto the probe.

7. The scanning probe microscope according to claim 1, further comprising a control unit for recognizing an upper section and lower section of a step of a regular wiring pattern including a semiconductor circuit element, limiting an amount of lifting of the probe to a minimum necessary distance for detachment of the probe from a pattern surface when the probe is scanning the upper section of the step and limiting the amount of lifting of the probe to a distance at which the probe does not contact the side of the step when the probe is scanning the lower section of the step.

8. The scanning probe microscope according to claim 1, further comprising a control unit for controlling the probe so as to detect that the probe is approaching or contacts a side of a step of the sample and to increase an amount of lifting of the probe or to lift the probe further.

9. The scanning probe microscope according to claim 1, wherein the probe comprises a unit for changing an angle of the probe contacting the surface of the sample in accordance with an inclination of the sample surface.

10. The scanning probe microscope according to claim 1, wherein the vibration unit vibrates the probe with a high frequency of at least 1 MHz.

11. The scanning probe microscope according to claim 1, wherein the vibration unit vibrates the probe with the high frequency of at least 10 MHz.

12. The scanning probe microscope according to claim 1, wherein the scanning probe microscope operates at a speed of at least 4 times of a speed obtained when the vibration unit vibrates the probe at a frequency of 100 kHz.

13. A sample observation method using a scanning probe microscope provided with a drive mechanism that controls a mutual positional relationship between a sample stage on which a sample is placed and a probe and a sensor that measures a deformation condition of the probe for measuring a three-dimensional surface shape of the sample, comprising the steps of detecting a condition of contact between the probe which is vibrated with a minute amplitude of an order of 1 nm and at a high frequency of at least 400 kHz and the sample and separating the probe from the surface of the sample, moving the probe close to a next measuring point and then continuing operations of bringing the probe closer to the sample until a certain contact condition with respect to the sample surface is detected.

14. The sample observation method according to claim 13, wherein the probe is vibrated at the high frequency of at least 1 MHz.

15. The sample observation method according to claim 13, wherein the probe is vibrated at the high frequency of at least 10 MHz.

16. The sample observation method according to claim 13, wherein the scanning probe microscope operates at a speed of at least 4 times of a speed obtained when the probe is vibrated at a frequency of 100 kHz.

* * * * *